(12) United States Patent
Kimura

(10) Patent No.: US 11,398,754 B2
(45) Date of Patent: Jul. 26, 2022

(54) STATOR ASSEMBLY AND MOTOR

(71) Applicant: DENSO CORPORATION, Kariya (JP)

(72) Inventor: Akihiro Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 203 days.

(21) Appl. No.: 16/856,323

(22) Filed: Apr. 23, 2020

(65) Prior Publication Data

US 2020/0373794 A1 Nov. 26, 2020

(30) Foreign Application Priority Data

May 21, 2019 (JP) .............................. JP2019-095125

(51) Int. Cl.

| H02K 1/18  | (2006.01) |
| H02K 21/14 | (2006.01) |
| H02K 1/14  | (2006.01) |
| H02K 3/52  | (2006.01) |
| H02K 3/32  | (2006.01) |
| H02K 5/04  | (2006.01) |

(52) U.S. Cl.
CPC .............. *H02K 1/146* (2013.01); *H02K 1/18* (2013.01); *H02K 3/32* (2013.01); *H02K 3/522* (2013.01); *H02K 5/04* (2013.01); *H02K 21/14* (2013.01)

(58) Field of Classification Search
CPC ........ H02K 1/185; H02K 1/146; H02K 21/14; H02K 3/522; H02K 1/18; H02K 3/32; H02K 5/04; H02K 11/33; H02K 5/1732; H02K 11/215; H02K 9/22; H02K 2211/03; H02K 2213/03; H02K 7/14; H02K 1/278

USPC ............................................. 310/89, 216.001
See application file for complete search history.

(56) References Cited

U.S. PATENT DOCUMENTS

| 8,258,670 B2 * | 9/2012 | Sakuma ................. H02K 1/185 |
| | | 310/216.118 |
| 9,729,018 B2 * | 8/2017 | Koenig .................... H02K 9/02 |
| 2004/0124731 A1 | 7/2004 | Kimura et al. |
| 2007/0063593 A1 * | 3/2007 | Braun ...................... H02K 5/15 |
| | | 310/58 |

FOREIGN PATENT DOCUMENTS

| JP | 4036148 B2 | 1/2008 |
| JP | 2008-193778 A | 8/2008 |
| JP | 6075539 B2 | 2/2017 |

OTHER PUBLICATIONS

U.S. Appl. No. 16/856,313, dated Apr. 23, 2020, Kimura.

* cited by examiner

*Primary Examiner* — Quyen P Leung
*Assistant Examiner* — Alexander A Singh
(74) *Attorney, Agent, or Firm* — Maschoff Brennan

(57) ABSTRACT

In a stator assembly, each stator core includes a plurality of protrusions and a plurality of recesses, which are provided periodically in a circumferential direction on an outer periphery. The protrusion abuts at least a part of an inner wall of a housing in the circumferential direction. The recess is smaller than the protrusion in a radial direction and has a gap relative to the inner wall of the housing. Adjacent stator cores are shifted in the circumferential direction by a predetermined shift angle such that a periodic unit formed of at least one protrusion and at least one recess appear alternately in the axial direction. The protrusion has a radius of curvature smaller than a radius of a circumscribed circle at a part abutting the inner wall of the housing.

13 Claims, 18 Drawing Sheets

N=10, θ=18°

N=9, θ=20°

N=8, θ=22.5°

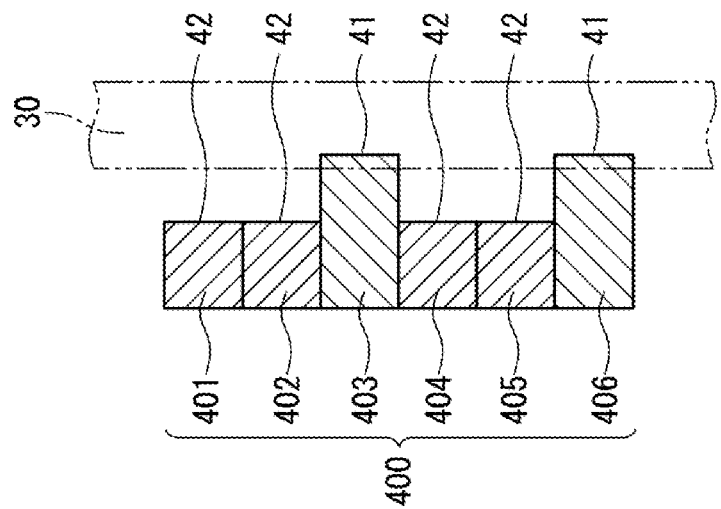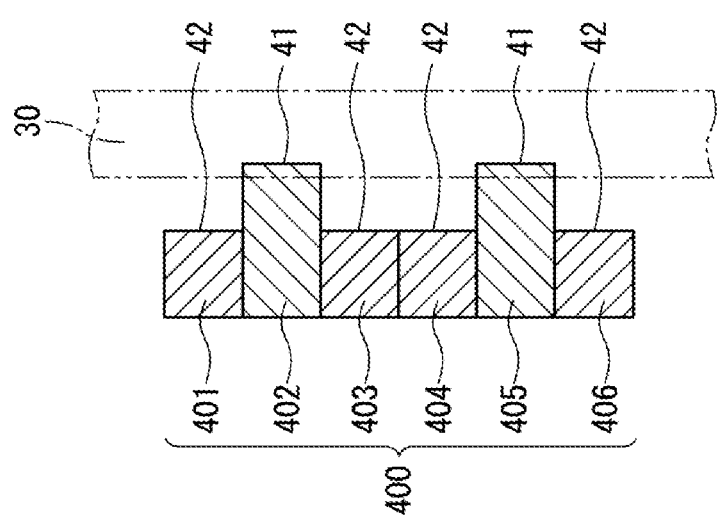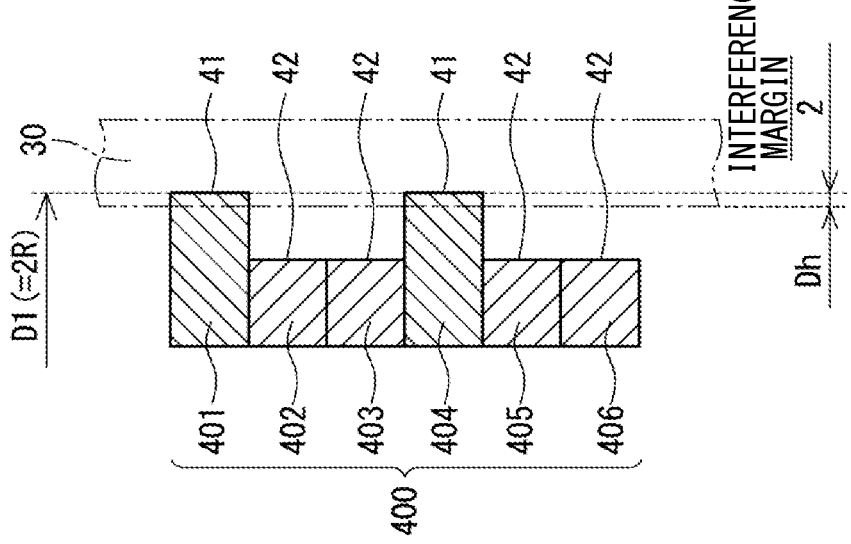

FIG. 18

RELATION AMONG UNIT ELEMENTS m, PERIODIC UNITS N AND SHIFT ANGLE $\theta$ $$\text{SHIFT ANGLE } \theta \text{ (°)} = \frac{360}{m \times N}$$

| m<br>N | 2 | 3 | 4 | 5 | 6 |
|---|---|---|---|---|---|
| ~~1~~ | ~~180.00~~ | ~~120.00~~ | ~~90.00~~ | ~~72.00~~ | ~~60.00~~ |
| 2 | 90.00 | 60.00 | 45.00 | 36.00 | 30.00 |
| 3 | 60.00 | 40.00 | 30.00 | 24.00 | 20.00 |
| 4 | 45.00 | 30.00 | 22.50 | 18.00 | 15.00 |
| 5 | 36.00 | 24.00 | 18.00 | 14.40 | 12.00 |
| 6 | 30.00 | 20.00 | 15.00 | 12.00 | 10.00 |
| 8 | 22.50 | 15.00 | 11.25 | 9.00 | 7.50 |
| 9 | 20.00 | 13.33 | 10.00 | 8.00 | 6.67 |
| 10 | 18.00 | 12.00 | 9.00 | 7.20 | 6.00 |
| 12 | 15.00 | 10.00 | 7.50 | 6.00 | 5.00 |

US 11,398,754 B2

STATOR ASSEMBLY AND MOTOR

CROSS REFERENCE TO RELATED APPLICATION

The present application claims the benefit of priority from Japanese Patent Application No. 2019-095125 filed on May 21, 2019. The entire disclosures of the above application are incorporated herein by reference.

FIELD

The present disclosure relates to a stator assembly and a motor.

BACKGROUND ART

In a conventional motor, a stator is tightly assembled to an inner wall of a cylindrical housing by interference fitting such as shrink fitting.

For example, a stator is provided with a contact region and a non-contact region alternately in a circumferential direction of an outer circumference. The contact region is in contact and the non-contact region is not in contact with an inner wall of a housing (sealed casing), respectively. As a result, magnetic property deterioration caused by compressive stress is alleviated and iron loss is reduced.

SUMMARY

According to the present disclosure, a stator assembly comprises a cylindrical housing, and a stator fixed to an inner wall of the housing by interference fitting, and formed of a plurality of annular stator cores stacked in an axial direction or formed of a plurality of split stator cores connected in a circumferential direction. Each stator core includes a plurality of protrusions and a plurality of recesses provided periodically in the circumferential direction on an outer periphery. The protrusion abuts at least a part of the inner wall of the housing in the circumferential direction. The recess is smaller than the protrusion in a radial direction and having a gap relative to the inner wall of the housing.

BRIEF DESCRIPTION OF THE DRAWINGS

FIG. 17A, FIG. 17B and FIG. 17C are schematic sectional views taken along lines XVIIA-XVIIA, XVIIB-XVIIB and XVIIC-XVIIC of FIG. 16, respectively; and FIG. 18 is a diagram showing a relationship between the number of unit elements, the number of periodic units and the shift angle.

DETAILED DESCRIPTION OF THE EMBODIMENT

Embodiment

Hereinafter, one embodiment of a stator assembly and a motor using the stator assembly will be described with reference to the drawings. The motor of the embodiment is used, for example, as a steering assist torque motor of an electric power steering device.

Figure 1:
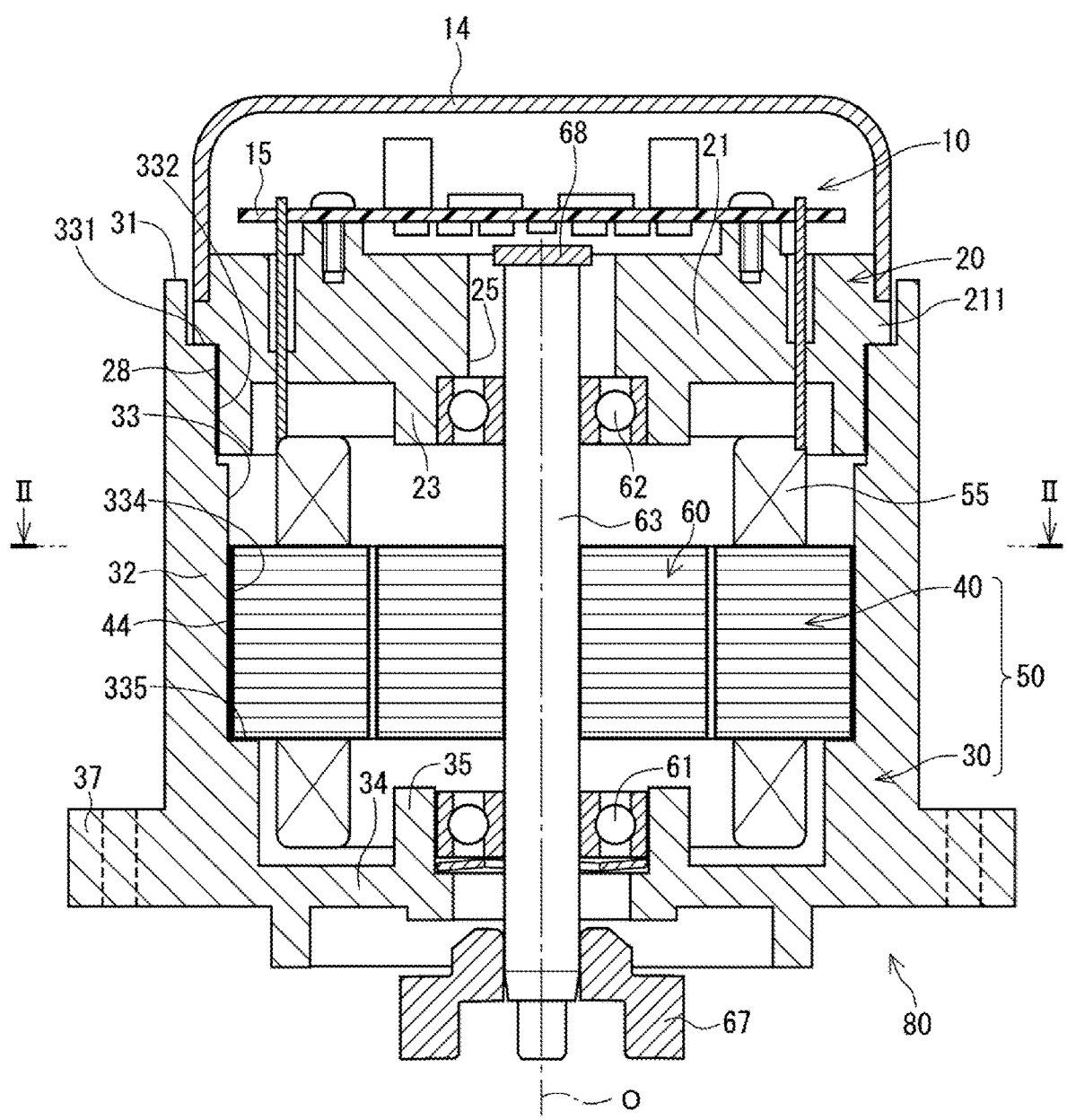
FIG. 1 is an axial sectional view of a motor to which a stator assembly according to one embodiment is applied.

First, the overall configuration of a motor 80 will be described with reference to FIG. 1 showing an axial sectional view. The motor 80 shown in FIG. 1 is configured as an electromechanically-integrated motor, in which an ECU (electronic control unit) 10 is provided integrally on one axial side. However, in other embodiments, the ECU 10 need not be provided integrally but may be provided separately from the motor 80. The output shaft side of the motor 80 shown in the lower side of FIG. 1 is referred to as a front side, and a cover 14 side shown in the upper side of FIG. 1 is referred to as a rear side. The rotation axis of the motor 80 is referred to as an axis O.

The motor 80 is a multi-phase brushless motor, and includes a cylindrical housing 30, a stator 40, a rotor 60 and the like as main structural components. The stator 40 is fixed tightly to an inner wall of the cylindrical housing 30 by interference fitting. The interference fitting includes press fitting and cold fitting in addition to shrink fitting. In the following description, the shrink fitting is mainly assumed. A sub-assembly in which the stator 40 is tightly fitted to the housing 30 at a manufacturing stage is referred to as a stator assembly 50 in the present embodiment.

In one embodiment, the cylindrical housing 30 is made of an aluminum alloy, specifically, ADC 12 which is an alloy for die casting. The 0.2% proof stress of the ADC 12 is about 150 [MPa], which is relatively low as compared with general metals. In the stator assembly 50 in which a metal having relatively low mechanical strength is used as a material of the housing 30, the technical significance of the present embodiment is effective as described below in detail.

The housing 30 has a bottomed cylindrical shape including a cylindrical portion 32 and a bottom portion 34. The inner wall 33 of the cylindrical portion 32 is formed so that its inner diameter gradually decreases in order from an open side to a closed side. A heat sink receiving step 331 near an axial end surface 31 receives a flange 211 of a main body 21 of a heat sink 20. A fixing portion outer wall 28 of the heat sink 20 is fixed to a heat sink fixing portion 332. An outer wall 44 of the stator 40 is fixed to a stator fixing portion 334 by the interference fitting. A stator receiving step 335 receives the outer edge of the front end surface of the stator 40.

A front bearing housing portion 35 that holds an outer ring of a front bearing 61 is provided at the bottom portion 34 of the housing 30. The front bearing 61 rotatably supports a rotary shaft 63 on its front side in the axial direction. A mounting stay 37 is provided on the front side outside the cylindrical portion 32.

The heat sink 20 is provided so as to face rear side end surfaces of the stator 40 and the rotor 60 in the opening on the opposite side to the bottom portion 34 of the housing 30. The heat sink 20 has the main body 21, which is a thick plate-shaped body and has a shaft hole 25 formed at a radially central portion, a rear bearing housing 23 for holding an outer ring of a rear bearing 62, and the like. The rear bearing 62 rotatably supports the shaft 63 on the rear side in the axial direction.

In the present embodiment, the stator 40 is made of an iron alloy, specifically, an electromagnetic steel plate. The stator 40 is formed by stacking in the axial direction a plurality of stator cores formed in an annular shape, that is, integrally in the circumferential direction in a ring. It is noted that, as described later in other embodiments, instead of stacking the annular stator cores in the axial direction, the stator may be formed by joint in the circumferential direction a plurality of stacks of stator cores divided in the circumferential direction. The coil 55 that forms a magnetic field when energized is wound around the stator 40.

The rotor 60 is rotatably provided radially inside the stator 40 via a gap relative to the stator 40. The rotor 60 in the example of FIG. 1 is configured by stacking a plurality of thin plate-shaped rotor cores in the axial direction similarly to the stator 40. The rotor 60 has a plurality of permanent magnets (not shown) along the outer circumference, and rotates with the shaft 63 by a rotating magnetic field generated in the stator 40 by energizing the coil 55.

The shaft 63 fixed to the center of the rotor 60 is rotatably supported by the front bearing 61 held by the bottom portion 34 and the rear bearing 62 held by the heat sink 20. A joint member 67 that transmits rotation is provided at the front end of the shaft 63. A sensor magnet 68 is provided at the rear end of the shaft 63 for detecting a rotation angle of the rotor 60.

The ECU 10 includes a substrate 15 fixed to the heat sink 20 and various electronic components mounted on the substrate 15. Heat generated by the electronic components due to current supply is released to the heat sink 20. A cover 14 is installed such that the end surface thereof is in contact with the flange 211 of the heat sink 20.

Figure 2:
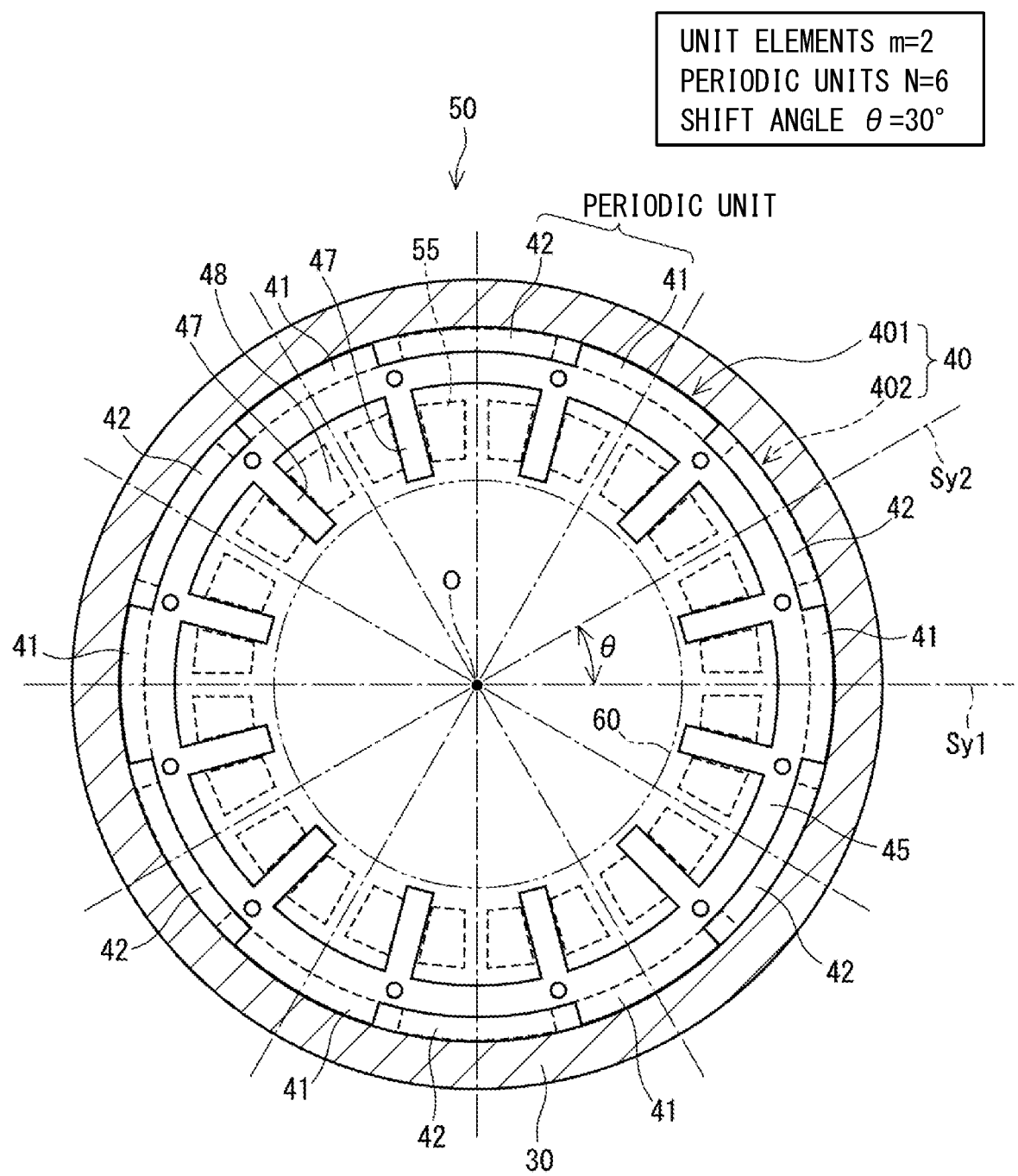
FIG. 2 is a radial sectional view of the stator assembly taken along line II-II of FIG. 1.
Figure 3:
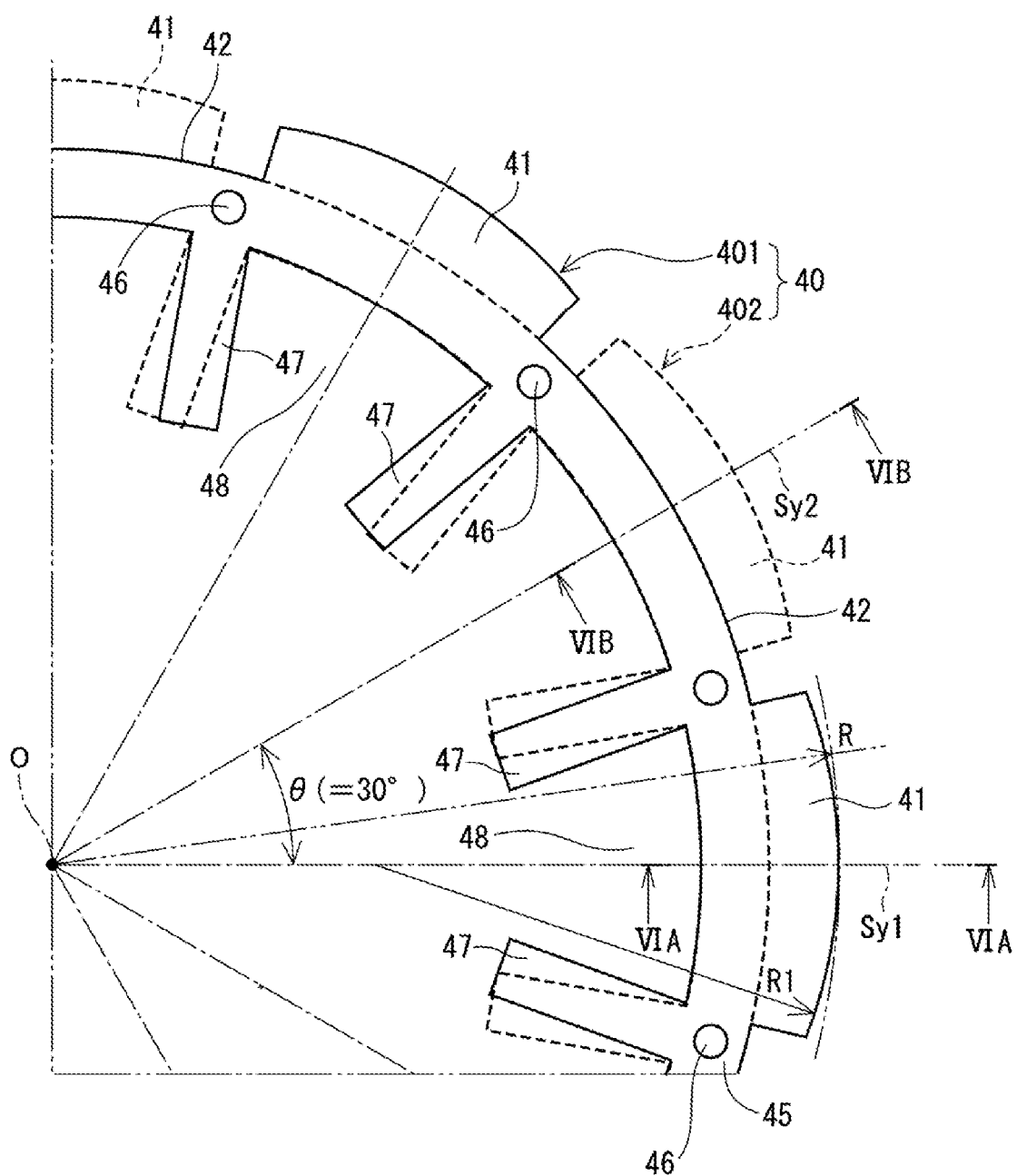
FIG. 3 is a partially enlarged view of a stator before being assembled tightly by interference fitting.
Figure 4A:
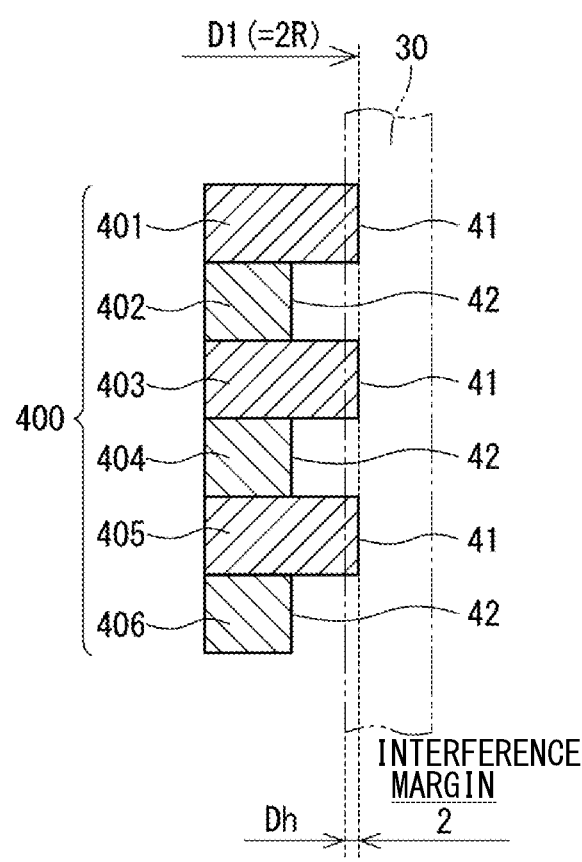
FIG. 4A and FIG. 4B are schematic cross-sectional views taken along line IVA-IVA and line IVB-IVB of FIG. 3, respectively.
Figure 4B:
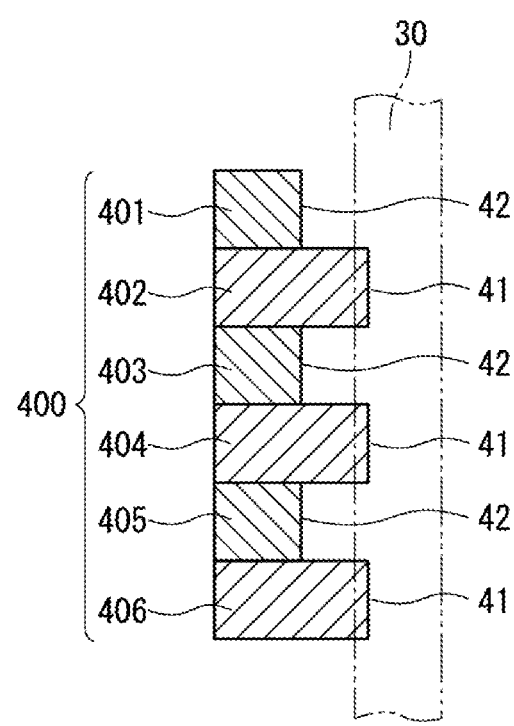

Next, a detailed configuration of the stator assembly 50 will be described with reference to FIG. 2 to FIG. 4B. FIG. 2 shows the stator assembly 50 after the stator 40 has been interference-fitted into the housing 30, and FIG. 3, FIG. 4A and FIG. 4B show the stator 40 before the interference fitting. As described above, the stator 40 is configured by stacking a plurality of stator cores 400 in the axial direction of the motor 80. In FIG. 4A and FIG. 4B showing cross sections of the stator 40 shown in FIG. 2 and FIG. 3, the stator cores 400 are referred to as a first stator core 401, a second stator core 402, a third stator core 403 and so on sequentially from the top layer to the bottom layer of the stack in cross section. In FIG. 4A and FIG. 4B, six stator cores 401 to 406, which are stacked as the stator cores of the first layer to the sixth layer, are shown as one example for explanation.

In FIG. 2 and FIG. 3, the first stator core 401 is indicated by a solid line, and the second stator core 402 is indicated by a broken line regardless of whether it is hidden in the sectional view. The same applies to the following drawings. Since the configuration of each of the stator cores 401, 402 and so on is substantially the same, the configuration of one stator core 401 will be described as a representative stator core. In the stator core 401, a plurality of protrusions 41 and a plurality of recesses 42 are periodically and alternately provided in the circumferential direction of the outer periphery of an annular back yoke portion 45. That is, a plurality of sets of the protrusion 41 and the recess 42 is provided periodically in the circumferential direction.

In the description of the radial configuration, the motor rotation axis O in FIG. 1 is referred to as a stator center O. The protrusion 41 is symmetrical with respect to a virtual straight line passing through the center of the protrusion 41 in the circumferential direction with the stator center O as a starting point. This imaginary straight line is referred to as a symmetric axis of the protrusion. The recesses 42 are also arranged symmetrically in the similar manner with respect to the stator center O as the protrusions 41. A radially outer curve that abuts or faces the inner wall of the housing 30 at the protrusion 41 and the recess 42 is referred to as an outer edge line. The outer edge line of the protrusion 41 has an arc shape with a radius of curvature R1 having a center on a symmetry axis Sy1. A virtual circle connecting the circumferential center of the outer edge line of the protrusion 41 with the stator center O as the center corresponds to a circumscribed circle of the protrusion 41. The radius of the circumscribed circle of the protrusion 41 is R, and the diameter is D1 (=2R).

Each protrusion 41 contacts the inner wall of the housing 30 at least partly in the circumferential direction. In the present embodiment, the radius of curvature R1 of the portion contacting the inner wall of the housing 30 is smaller than the radius R of the circumscribed circle of the protrusion 41. As a result, the center portion in the circumferential direction abuts the inner wall of the housing 30 as at least a part in the circumferential direction. The recess 42 is smaller in the radial direction than the protrusion 41 and has a gap between the recess 42 and the inner wall of the housing 30.

As shown in FIG. 2 and FIG. 3, the first stator core 401 and the second stator core 402 are stacked such that the protrusion 41 and the recess 42 alternate in the circumferential direction and the symmetry axis Sy1 of the protrusion 41 and the symmetry axis Sy2 of the recess 42 coincide with each other. The third and other odd-numbered stator cores are provided in phase with the first stator core 401, and the fourth and other even-numbered stator cores are provided in phase with the second stator core 402. Here, a phase difference between the stator cores of the adjacent layers stacked in the axial direction, that is, the stack direction, is referred to as a predetermined shift angle θ.

As described above, in the stator 40 according to the present embodiment, one protrusion 41 and one recess 42 are periodically and alternately arranged in such an order as protrusion-recess-protrusion-recess and so forth. In this case, a combination of one protrusion 41 and one recess 42 adjacent to each other is referred to as a periodic unit. As shown in FIG. 4A and FIG. 4B, when viewed in the axial cross section, the stator cores 401 to 406 are stacked such that one protrusion 41 and one recess 42 appear alternately in the axial direction and the stator cores adjacent to each other in the axial direction are shifted with the predetermined shift angle θ in the circumferential direction.

For example, in the cross section of FIG. 4A, the protrusions 41 of the odd-numbered stator cores 401, 403 and 405 in the first, third and fifth layers appear, and the recesses 42 of the even-numbered stator cores 402, 404 and 406 of the second, fourth and sixth layers appear. In the cross section of FIG. 4B, the recesses 42 of the odd-numbered stator cores 401, 403 and 405 of the first, third and fifth layers appear and the protrusions 41 of the even-numbered stator cores 402, 404 and 406 in the second, fourth and sixth layers appear. The diameter D1 (=2R) of the circumscribed circle of the protrusion 41 is larger than an inner diameter Dh of the housing 30, and the difference D1−Dh is an interference margin for the interference fitting. The amount of compression per one protrusion 41 on one side in the radial direction corresponds to one half of the interference margin, that is, interference/2.

In the present embodiment, the number of unit elements that is the total number of the protrusions 41 and the recesses 42 in one periodic unit is assumed to be "m," and the number of periodic units in the 360° range is assumed to be "N." The shift angle is calculated as 360×n/(m×N) [°], with "n" being a natural number other than "m." In the configuration shown in FIG. 2 and FIG. 3, the number of unit elements "m" is 2, the number of periodic units "N" is 6. Assuming that "n" is 1, the shift angle θ is 30°. Although it is assumed that "n" is 1 in the present embodiment, "n" may be assumed to be other than 1. In case that "n" is assumed to be 3, for example, the shift angle θ is 90°.

For example, in case of a three-phase motor, the number of periodic units "N" is a multiple of 3 in order to ensure three-phase symmetry. Further, in case of a motor having two sets of three-phase windings, the number "N" of periodic units is a multiple of 6. In case that the simplest combination of one protrusion 41 and one recess 42 is adopted as the periodic unit, the number "m" of unit elements is 2. The configuration shown in FIG. 2 and FIG. 3 is based on such an assumption. However, the present invention is not limited thereto, and the number "m" of unit elements and the number "n" of periodic units may be appropriately set arbitrarily according to the number of AC phases, the number of winding sets, and the like.

Next, internal configuration of the stator 40 will be described. The stator core 401 is formed to have a plurality of magnetic pole teeth 47 arranged equi-angularly in the circumferential direction and protruding radially inward from the annular back yoke portion 45. The coil 55 is wound around the magnetic pole teeth 47. As a winding method of the coil 55, for example, an SC winding using a segment conductor may be adopted. Slots 48 are formed between adjacent magnetic pole teeth 47. Further, the rotor 60 is rotatably provided via a gap on the radially inner sides of the tip ends of the magnetic pole teeth 47. In FIG. 2, the coil 55 and the rotor 60 are indicated by broken lines and a two-dot chain line, respectively.

In the example of FIG. 2 and FIG. 3, the same number (12 in this example) of magnetic pole teeth 47 as the total number of the protrusions 41 and the recesses 42 are formed. Alternatively, a plurality of magnetic pole teeth 47 may be provided for each protrusion 41 and each recess 42. A joint portion 46 provided at a boundary between the adjacent protrusion 41 and recess 42 in the back yoke portion 45 will be described later with reference to FIG. 5.

Figure 5:
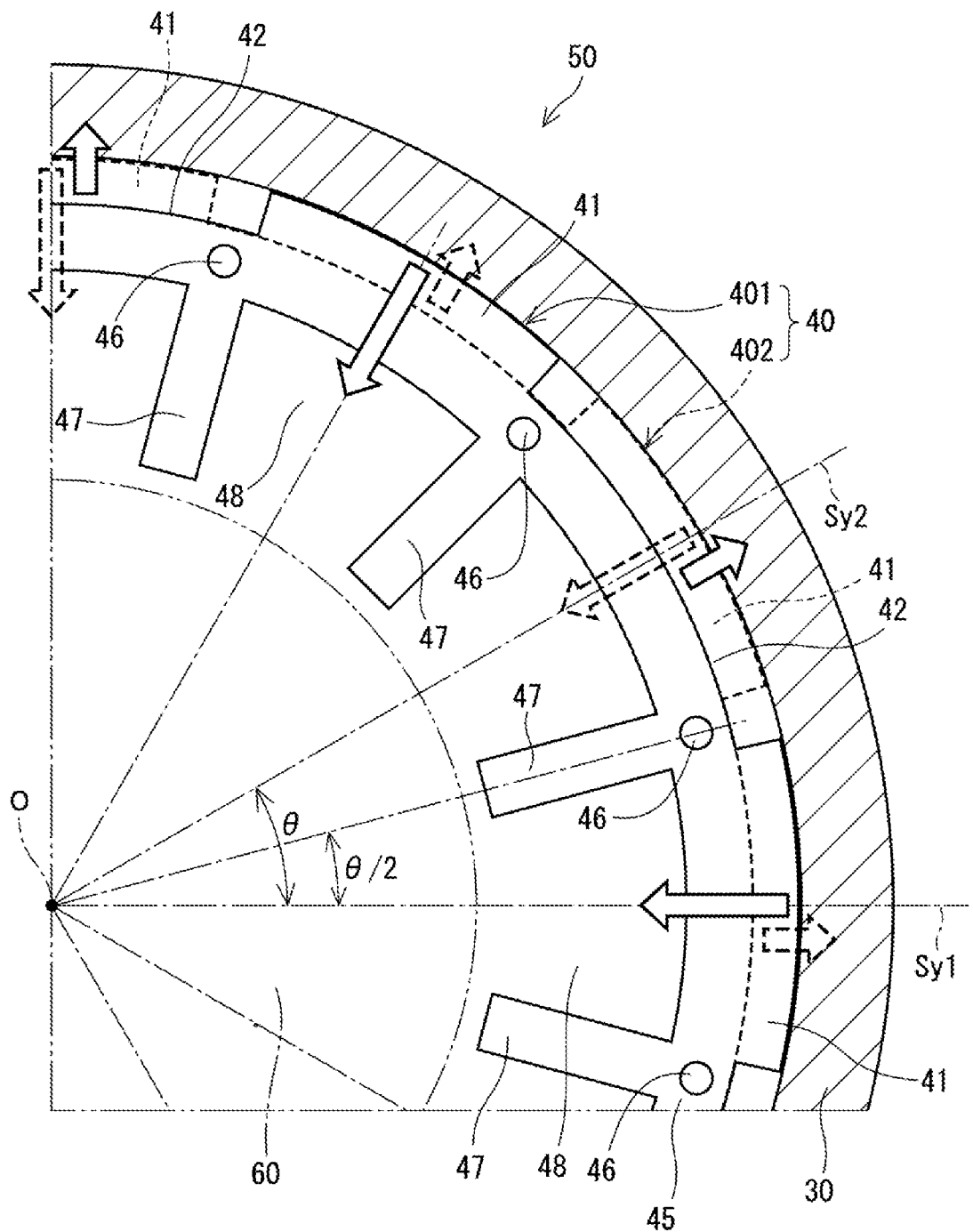
FIG. 5 is a schematic partial view showing radial deformation in a state where the stator is assembled tightly to the housing by the interference fitting.

Next, deformation of the stator 40 caused at the time of the interference fitting will be described with reference to FIG. 5. In FIG. 5, solid line block arrows represent the deformation of the first stator core 401, and broken line block arrows represent the deformation of the second stator core 402. In the present embodiment, the radius of curvature R1 of the central portion of the protrusion 41 in the circumferential direction that contacts the inner wall of the housing 30 is set smaller than the radius R of the circumscribed circle. Therefore, the back yoke portion 45 is likely to be easily deformed by the interference fitting. That is, it is likely that the protrusion 41 is deformed in the radially inward direction and the recess 42 is deformed in the opposite direction, that is, in the radially outward direction.

As described above, in the present embodiment, the adjacent stator cores of the same shape are stacked in the axial direction with the predetermined shift angle θ in the circumferential direction so that the protrusion 41 and the recess 42 of the periodic unit appear alternately in the axial direction, and further the radius of curvature R1 of the outer periphery of the protrusion 41 is smaller than the radius R of the circumscribed circle of the protrusion 41. With this configuration, the protrusion 41 and the recess 42 are deformed in the directions opposite to each other in the radial direction, thereby realizing an effect of making the outer peripheral stress of the interference fitting uniform, that is, generally equalized, in the circumferential direction.

The plurality of stacked stator cores 401, 402 and the like are joined together by a fixing method such as crimping or welding at the joint portions 46 in the axial direction. Preferably, the joint portion 46 of each stator core 401, 402 and the like is provided at the boundary between the protrusion 41 and the recess 42, where the amount of deformation in the back yoke 45 is considered to be minimum. That is, the joint portion 46 is arranged at every shift angle θ (30° in this example) with reference to a position shifted by one half of the shift angle θ from the circumferential center of each protrusion 41 in the back yoke portion 45. Specifically, the joint portion 46 is at a position, from which the tooth 47 protrudes radially inward, and which is immediately outside the protrusion 41 in the circumferential direction and an end of the recess 42 in the circumferential direction.

In case the joint portion 46 is arranged at another position, the deformation of the stator 40 is limited, and the effect of the present embodiment for equalizing the outer peripheral stress of the housing using the deformation of the protrusion 41 tends to be reduced. Therefore, by arranging the joint portion 46 at the above position, the effect of the present embodiment is effectively exhibited.

Next, a relationship between a temperature in shrink fitting, the outer diameter of the stator 40 and the inner diameter of the housing 30 will be described with reference to FIG. 6. In the present embodiment, a linear expansion coefficient of the ADC 12 which is the material of the housing 30 is about $21 \times 10^{-6}$, and a linear expansion coefficient of a magnetic steel sheet which is the material of the stator 40 is about $13 \times 10^{-6}$. That is, the material of the housing 30 and the material of the stator 40 have different linear expansion coefficients. Specifically, the linear expansion coefficient of the material of the housing 30 is larger than the linear expansion coefficient of the material of the stator 40.

Figure 6:
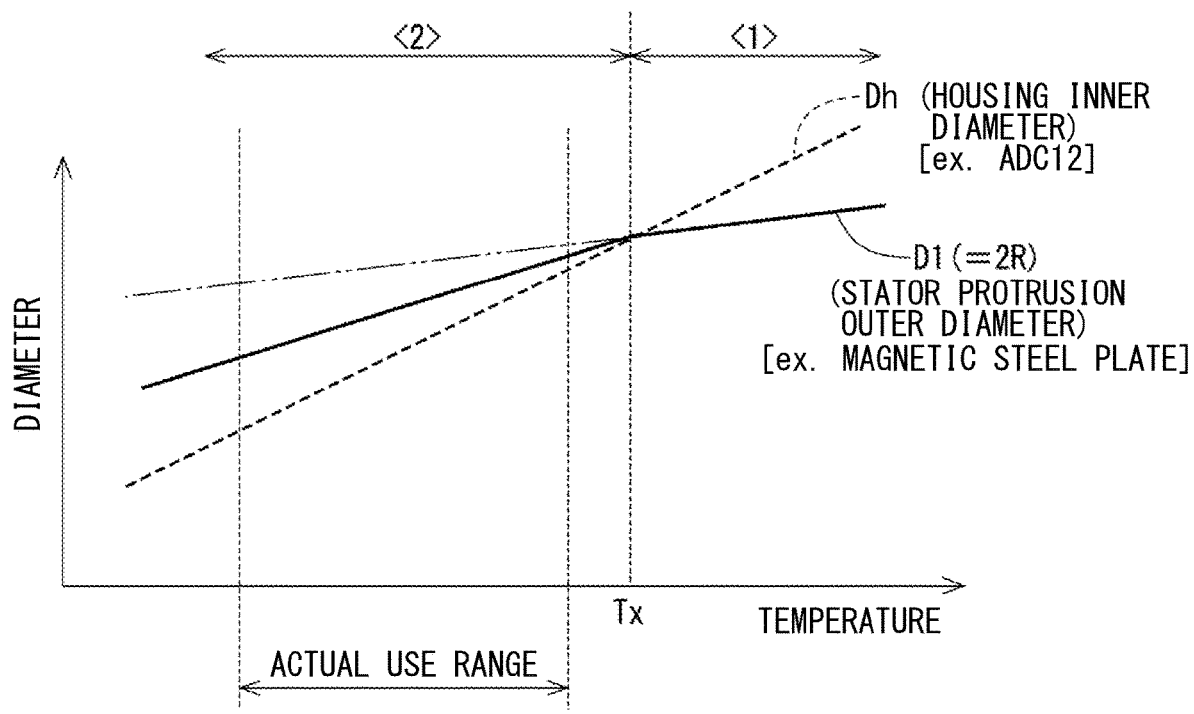
FIG. 6 is a graph showing a difference in linear expansion coefficients between the housing and the stator.

In FIG. 6, the horizontal axis indicates a temperature, and the vertical axis indicates a diameter of each member, that is, housing 30 and stator 40. A conversion temperature Tx is a temperature higher than the upper limit of the actual use range. A temperature range exceeding the conversion temperature Tx is identified as a temperature range <1>, and a temperature range below the conversion temperature Tx is identified as a temperature range <2>. In the temperature range <2>, a broken line of the housing inner diameter Dh and a two-dot chain line of the outer diameter D1 (=2R) of the protrusion of the stator 40 indicate a virtual diameter of the member alone. The solid line shows the diameter dimension in the shrink-fit state. In the temperature range <2>, the interference between the housing 30 and the stator 40 becomes relatively smaller as the temperature becomes higher.

The description will be given in order from the high temperature side range. In the temperature range <1>, the housing 30 is not in contact with the protrusion 41. In the temperature range <2>, the housing 30 and the protrusion 41 abut. As the temperature decreases, the protrusion 41 is deformed in the radially inward direction. At this time, the inner diameter of the housing 30 also increases. Therefore, the diameter (solid line) in the interference-fit state is between the inner diameter (broken line) of the housing 30 alone and the outer diameter of the protrusion 41 (tow-dot chain line) of the stator 40 alone.

In another embodiment, the linear expansion coefficient of the material of the housing 30 may be smaller than the linear expansion coefficient of the material of the stator 40, and the housing 30 may be tightly fitted by, for example, a cold fitting. In this case, the dimensional relationship between the housing 30 and the stator 40 is opposite to that shown in FIG. 6, and the conversion temperature Tx is set to a temperature lower than the lower limit of the actual use range.

Figure 7:
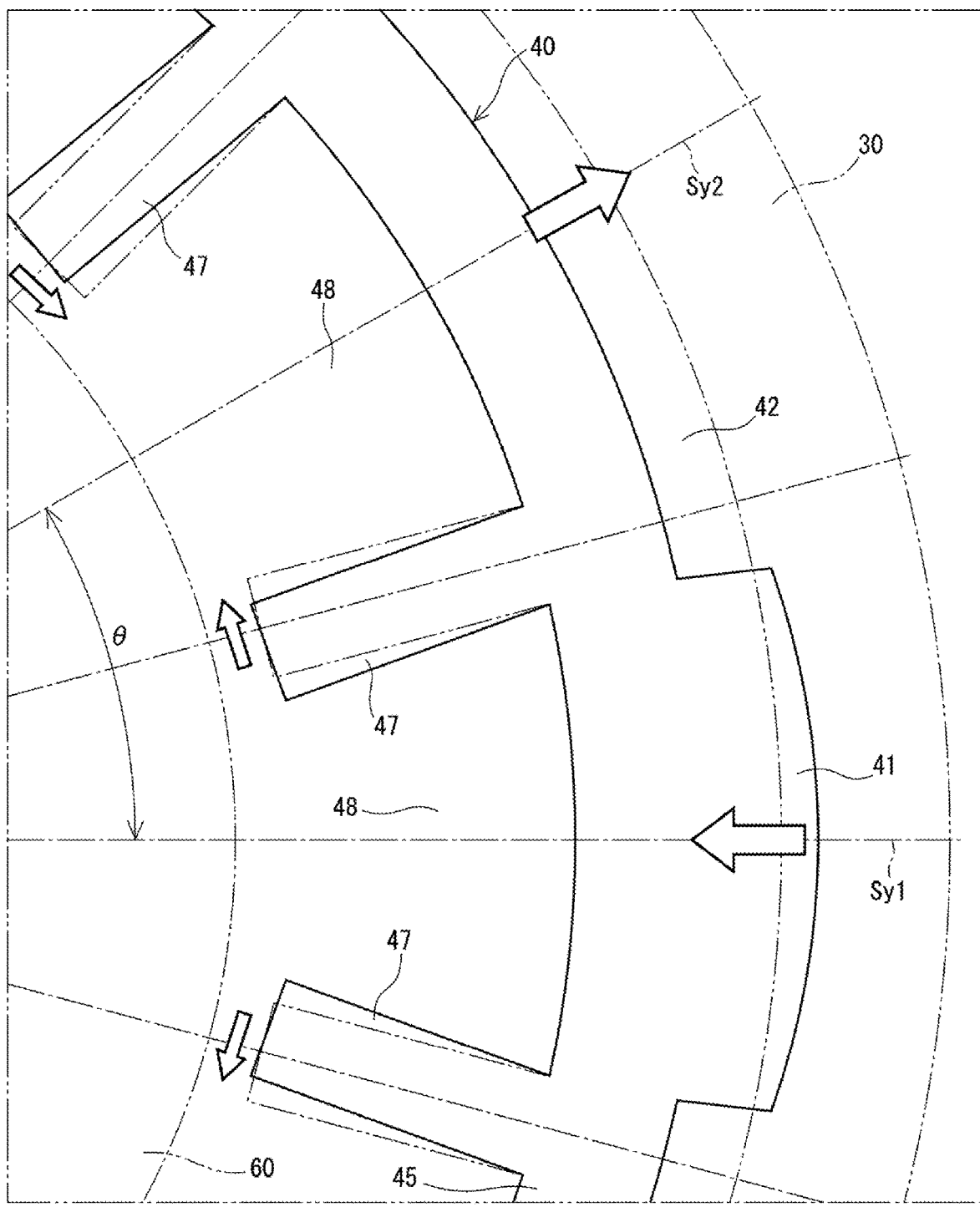
FIG. 7 is a schematic partial view showing circumferential deformation of magnetic pole teeth caused by the interference fitting.
Figure 8:
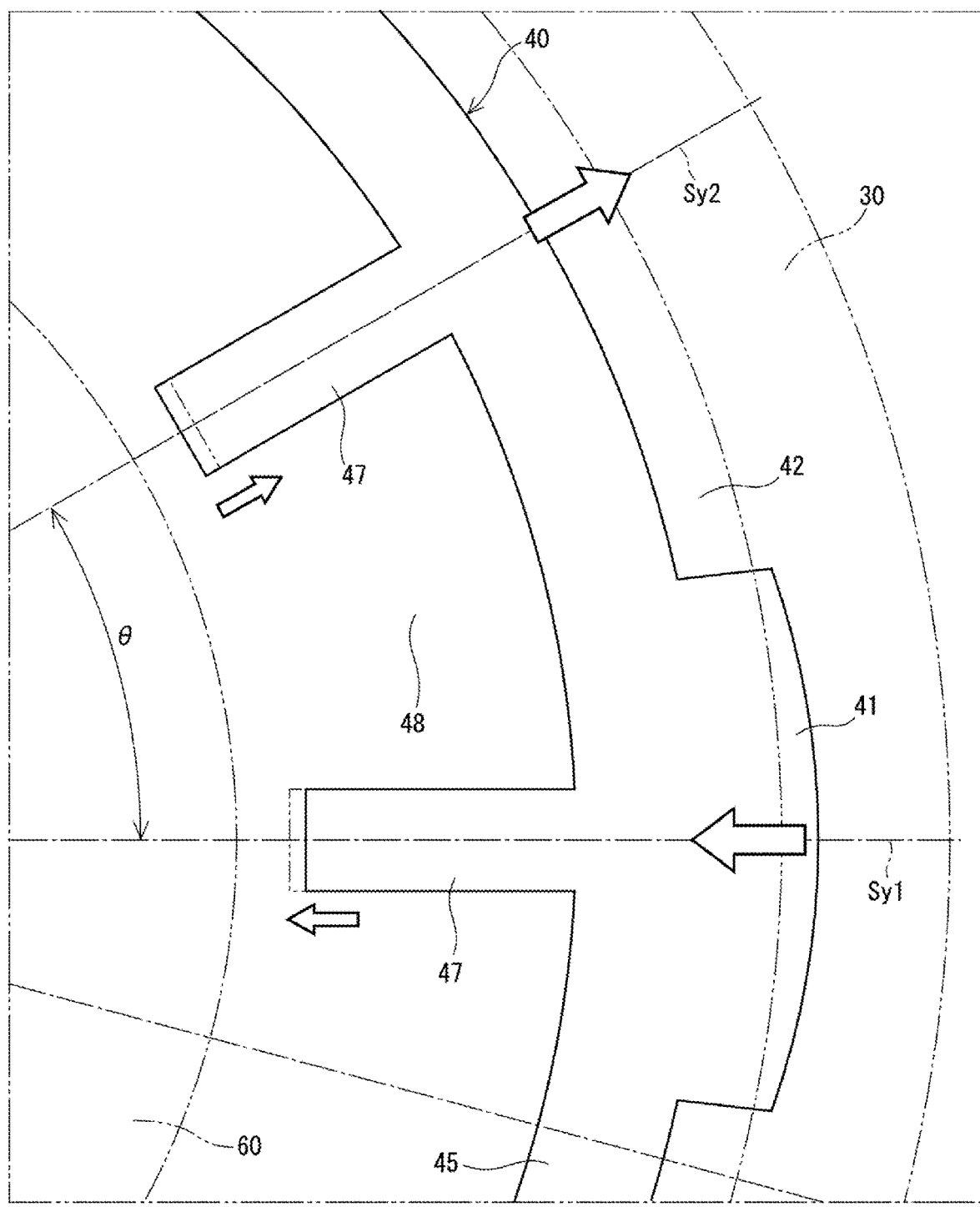
FIG. 8 is a schematic partial view showing radial deformation of the magnetic pole teeth caused by the interference fitting.

Next, with reference to FIG. 7 and FIG. 8, a description will be given of positions where the plurality of magnetic pole teeth 47 are formed in the stator core. In FIG. 7 and FIG. 8, the joint portion 46 is not illustrated. When the stator 40 is tightly fitted by interference, the annular back yoke portion 45 is deformed, and the magnetic pole teeth 47 protruding radially inward from the back yoke portion 45 are also deformed. The solid line indicates the position of the magnetic pole teeth 47 in a state before the stator 40 is tightly fitted to the housing 30, and the two-dot chain line indicates the position after the tight fitting.

As shown in FIG. 7, in the configuration in which the magnetic pole teeth 47 are provided at the boundary between the protrusion 41 and the recess 42, the angular interval between the magnetic pole teeth 47 on both sides with respect to the center in the circumferential direction of the protrusion 41, that is, the circumferential width of the slot 48 in the circumferential direction increases. That is, the protrusion 47 shown by a solid line changes its position as shown by a two-dot chain line. As a result, in case of a distributed winding configuration, particularly an SC winding configuration, the coil 55 may be loosened due to vibration or the like. On the other hand, with reference to the center in the circumferential direction of the recess 42, the interval between the magnetic pole teeth 47 on both sides, that is, the circumferential width of the slot 48 is reduced by the interference fitting. As a result, in case of the distributed winding configuration, particularly in the SC winding configuration, a load may be applied to the coil 55.

Therefore, in a state before the interference fitting, the plurality of magnetic pole teeth 47 are formed preferably at circumferential positions shifted from a target circumferential position, which is to be attained after the interference fitting, in a direction opposite to a direction of the circumferential deformation caused by the interference fitting. Specifically, in the stator core 40, two adjacent magnetic pole teeth 47 provided at the boundaries between the protrusion 41 and the recess 42, that is, at both circumferential ends of the protrusion 41 sandwiching the protrusion 41, are formed to incline inwardly in the circumferential direction. Further, two adjacent magnetic pole teeth 47 provided at both circumferential ends of the recess 42 sandwiching the recess 42 without sandwiching the protrusion 41 are formed to incline outwardly in the circumferential direction. That is, in the stator core alone before interference-fitted into the housing 30, a circumferential distance between the tip ends of the magnetic pole teeth 47 sandwiching the protrusion 41 is shorter than that of the tip ends of the magnetic pole teeth 47 sandwiching the recess 42. Thus, since the magnetic pole teeth 47 are formed at the positions indicated by the solid line in the stator core 40 alone before the interference fitting, the magnetic pole teeth 47 move to the target positions indicated by the two-dot chain line after deformation caused by the interference fitting. The amount by which the position of the magnetic pole tooth 47 is shifted may be adjusted so that the circumferential width of the slot 48 after the interference fitting becomes an appropriate value. Thereby, it is possible to prevent the load from being applied to the coil 55 and the coil 55 from being loosened. In addition, it is thus possible to check a product by observing the stator 40 in a state disassembled from the housing 30.

As shown in FIG. 8, in the configuration in which the magnetic pole teeth 47 are provided at the centers in the circumferential direction of the protrusions 41 and the recesses 42, the deformation in the radial direction is increased although the deformation in the circumferential direction is decreased. The magnetic pole tooth 47 provided at the center of the protrusion 41 in the circumferential direction is deformed radially inward by the interference fitting as shown by a tow-dot chain line, and the magnetic tooth 47 provided at the center of the recess 42 in the circumferential direction is deformed radially outward as shown by a tow-dot chain line. In particular, when deformed in the radially inward direction, the gap between the tip of the magnetic pole tooth 47 and the rotor 60 becomes narrow, and the risk of contact between the magnetic pole tooth 47 and the rotor 60 increases.

Therefore, in a state before the interference fitting, the magnetic pole teeth 47 are formed preferably at radial positions shifted from a target radial position, which is to be attained after the interference fitting, in a direction opposite to a direction of radial deformation caused by the interference fitting. Specifically, in the stator core alone before being interference-fitted in the housing 30, the magnetic pole teeth 47 protruding radially inward from the circumferential center of the protrusion 41 are shorter in length in the radial direction from an inner peripheral wall of the back yoke portion 45 than the magnetic pole teeth 47 protruding radially inward from the circumferential center of the recess 42. Thus, since the magnetic pole teeth 47 are formed at the positions indicated by the solid line in the stator core alone before the interference fitting, the magnetic pole teeth 47 move to the target positions indicated by the two-dot chain lines after deformation caused by the interference fitting. Thereby, the risk of contact between the magnetic pole teeth 47 and the rotor 60 can be avoided. Similarly to the circumferential position, it is possible to check the product by observing the stator 40 in the state disassembled from the housing 30.

Next, optimization of the radius of curvature R1 of the protrusion 41 will be described. Here, a ratio of the radius of curvature R1 of the portion of the protrusion 41 abutting on the housing 30 relative to the radius R of the circumscribed circle of the protrusion 41 is defined as a protrusion radius ratio R1/R. Hereinafter, the radius of curvature R1 of the portion of the protrusion 41 abutting on the housing 30 is abbreviated as a radius of curvature R1 of the protrusion 41. As a premise of the present embodiment, the radius of curvature R1 of the protrusion 41 is set smaller than the radius R of the circumscribed circle, that is, R1<R (=R1/R<1). It is obvious that R1/R>0 as long as the radius of curvature R1 exists.

Here, the influence of the value of the protrusion radius ratio R1/R on the quality of interference fitting in the range of 0<R1/R<1 is evaluated. As an index of the quality of the interference fitting, attention is paid to a housing outer peripheral stress, which acts on the housing 30 when the stator 40 is interference fitted to the housing 30, and a stator reaction force, which is applied to the housing 30 from the stator 40.

Figure 9:
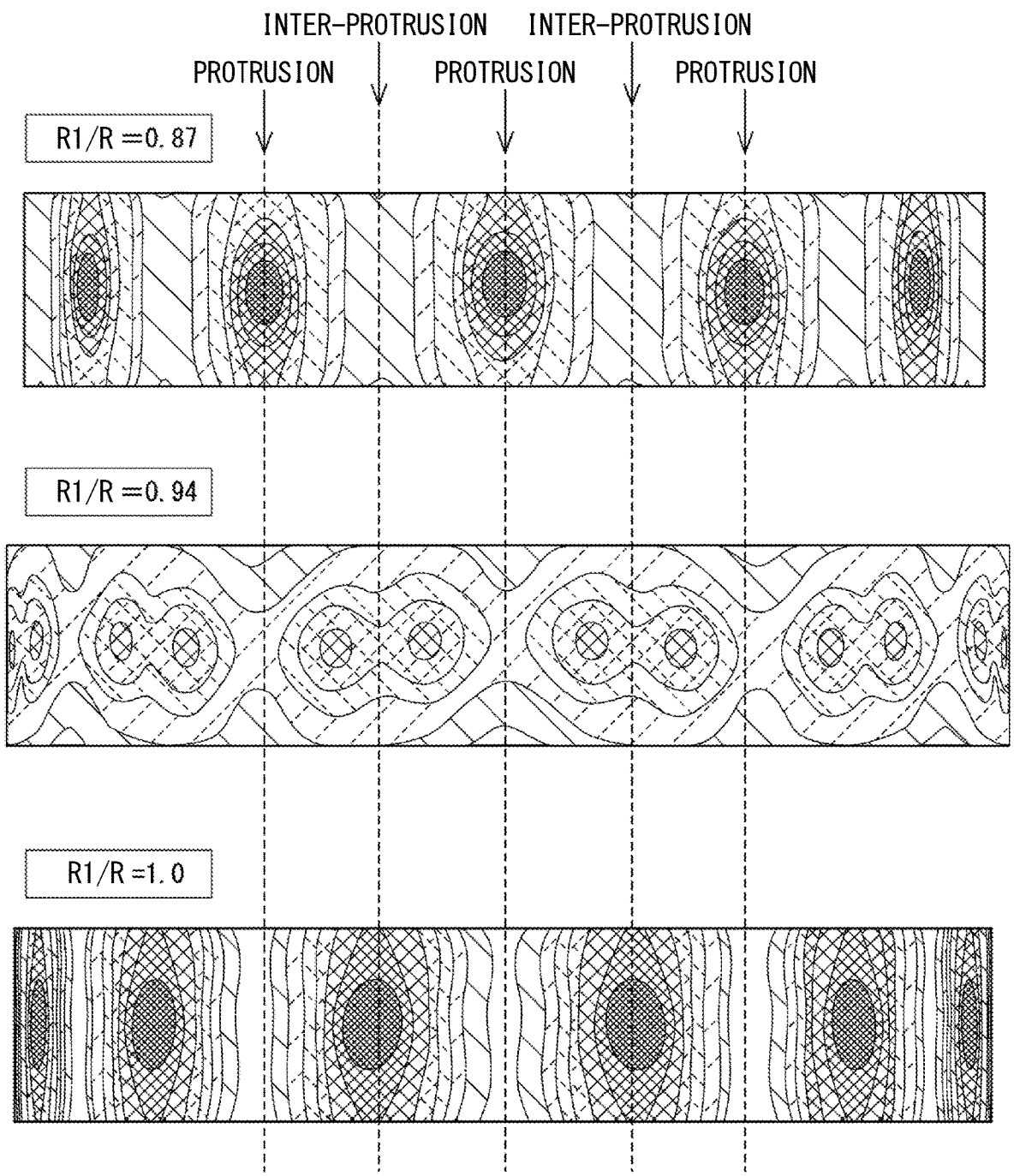
FIG. 9 is a distribution diagram of housing outer peripheral stress acting on a protrusion and between protrusions (recess) in case that protrusion radius ratios R1/R is 0.87, 0.94 and 1.0.

FIG. 9 shows the distribution of the housing outer peripheral stress acting on the protrusion 41 and an inter-protrusion space, which is between the protrusions 41, at the time of interference fitting. The inter-protrusion space is a space between the first protrusion 41 and the second protrusion 41, and corresponds to a position which is shifted by an angle $\theta/2$ (that is, 15°) from the symmetry axis Sy1 in FIG. 3. The housing outer peripheral stress is higher and lower as the hatching in the figure is more crowded (area is darker) and less crowded (area is brighter), respectively. Hereinafter, the protrusions 41 and recesses 42 are referred to without using reference numerals.

In FIG. 9, the housing outer peripheral stress distribution is shown with respect to three exemplary cases. In each case, the stator 40 having an outer diameter of 87 [mm], that is, the radius R of the circumscribed circuit is 43.5 [mm]. However, in the top, middle and bottom exemplary cases, the radius of curvature R1 of the protrusion 41 is 38.0, 41.0 and 43.5 [mm], respectively. Further, in the top, middle and bottom exemplary cases, the protrusion radius ratio R1/R is 0.87, 0.94 and 1.0, respectively.

As shown in the top exemplary case, in which the protrusion radius ratio R1/R is relatively small as 0.87, the housing outer peripheral stress at the protrusion is large. Conversely, as shown in the bottom exemplary case, in which the protrusion radius ratio R1/R is relatively large as 1.0, the housing outer peripheral stress at the inter-protrusion space is large. As shown in the middle exemplary case, in which the protrusion radius ratio R1/R is around 0.94, a difference between the housing outer peripheral stresses at the protrusion and the inter-protrusion space is reduced and the outer peripheral stresses are more equalized in the circumferential direction. Details of setting of the protrusion radius ratio R1/R will be described later with reference to FIG. 11 to FIG. 15.

Figure 10A:
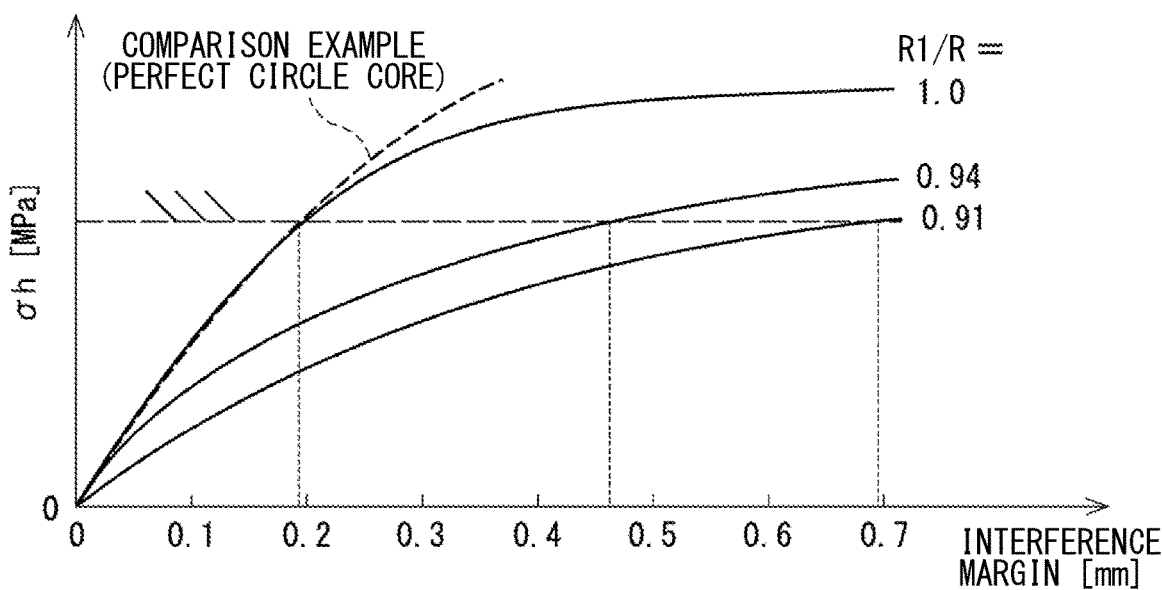
FIG. 10A and FIG. 10B are graphs showing a relationship between an interference margin and a housing outer peripheral stress, and a relationship between the interference margin and a stator reaction force, respectively.
Figure 10B:
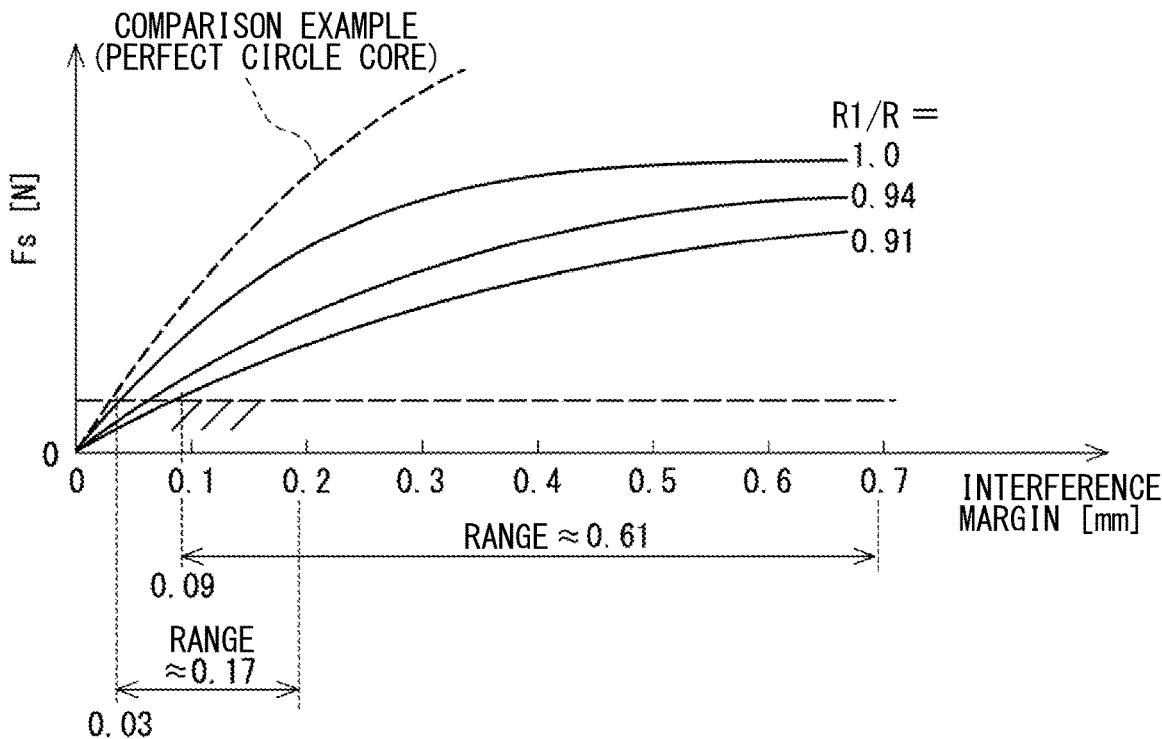

FIG. 10A shows a relationship between an interference margin (tightening margin) and a housing outer peripheral stress $\theta h$, and FIG. 10B shows a relationship between the interference margin and a stator reaction force Fs. Here, as shown in FIG. 4A, the interference margin is defined as a difference between the diameter D1 (=2R) of the circumscribed circle of the protrusion 41 and the inner diameter Dh of the housing 30. The amount of compression of the protrusion 41 on one side in the radial direction corresponds to one half of the interference margin.

FIG. 10A shows exemplary cases of the present embodiment in which the protrusion radius ratios R1/R are 0.91, 0.94 and 1.0. FIG. 10B shows exemplary cases of a comparison example, in which the stator core is formed in a perfect circular shape (perfect circle core) having no protrusions on the outer periphery. The horizontal axis shows a numerical example of the interference margin within a range assumed as common technical knowledge. Specific numerical values are not indicated for the housing outer peripheral stress $\theta h$ and the stator reaction force Fs on the vertical axis.

The upper limit of the interference margin is determined in FIG. 10A from the upper limit of the housing outer peripheral stress $\theta h$ for preventing the housing from cracking. In the present embodiment, since the 0.2% proof stress of the ADC 12, which is the material of the housing, is 150 [MPa], a value considering the safety factor in addition to 150 [MPa] is set as the upper limit of the housing outer peripheral stress $\sigma h$. In case of the perfect circle core and the protrusion radius ratio R1/R of 1.0, the upper limit of the interference margin is about 0.2 [mm]. The upper limit of the interference margin increases as the protrusion radius ratio R1/R decreases, and is approximately 0.7 [mm] when the protrusion radius ratio R1/R is 0.91.

The lower limit of the interference is determined in FIG. 10B from the lower limit of the stator reaction force Fs for satisfying the tightening force (or the tightening strength). The tightening force corresponds to a value determined by multiplying the radial stator reaction force Fs by a friction coefficient. For example, the stator reaction force Fs is set as a value that can withstand an impact load. The lower limit of the interference margin is about 0.03 [mm] for the perfect circle core and the protrusion radius ratio R1/R=1.0, and about 0.09 [mm] for the protrusion radius ratio R1/R=0.91 [mm].

From this result, an interference margin range, which is the difference between the upper limit and the lower limit, increases to about 0.61 [mm] in case of the protrusion radius ratio R1/R=0.91 relative to about 0.17 [mm] in the case of the perfect circle core and the protrusion radius ratio R1/R=1.0. This is because, in case the protrusion radius ratio R1/R is smaller than 1, the stator 40 is easily deformed and the sensitivity of the housing outer peripheral stress $\theta h$ and the stator reaction force Fs is reduced. By expanding the effective interference margin range, design tolerances can be relaxed and productivity can be improved.

Next, with reference to FIG. 11A to FIG. 15, a description will be given of the study of the optimum range of the protrusion radius ratio R1/R. FIG. 11A to FIG. 14B show that the relationship between the protrusion radius ratio R1/R and the following three comparison parameters [1] to [3] in the range of the protrusion radius ratio R1/R, which is from 0.84 to 1.0, for the 11 shift angles $\theta$, which is from 10° to 90°. Name and technical significance of each comparison parameter are described below.

[1] Difference in housing outer peripheral stresses ($\Delta\sigma h$) between the protrusion and the inter-protrusion space, which is indicated by square marks connected by a broken line:

This difference is simply referred to as a housing outer peripheral stress difference Δσh without "protrusion and inter-protrusion space." As exemplified as the middle case in FIG. 9, as the housing outer peripheral stress difference Δσh is closer to 0, the housing outer peripheral stress σh is made uniform, and a local increase in stress is prevented.

[2] Maximum value of housing outer peripheral stress (σh_max), which is indicated by triangle marks connected by a one-dot chain line:

If a housing outer peripheral stress maximum value σh_max increases, the housing may crack. Therefore, a lower value is preferable. The housing outer peripheral stress maximum value σh_max is a value of the protrusion in a range where the housing outer circumferential stress difference Δσh is positive (Δσh>0), and is a value of the inter-protrusion space in a range where the housing outer circumferential stress difference Δσh is negative (Δσh<0).

[3] Tightening efficiency index (τ=Fs/σh_max), which is indicated by circles connected by a solid line:

Here, a value determined by dividing the stator reaction force Fs by the maximum value σh_max of the housing outer peripheral stress is defined as a tightening efficiency index τ, which is an index indicating the efficiency of the interference fitting between the stator and the housing. Thus, the tightening efficiency means the efficiency of interference fitting between the stator and the housing. As described above, the value determined by multiplying the stator reaction force Fs in the radial direction by the constant friction coefficient corresponds to the tightening force. As the tightening efficiency index τ increases, the tightening force for the same risk of housing crack increases and an efficient interference fitting is realized.

In each of FIG. 11A to FIG. 14B, the horizontal axis (dimensionless) represents the protrusion radius ratio R1/R. The left vertical axis (unit: [MPa]) represents the difference Δσh and the maximum value σh_max of the housing outer peripheral stress, and the right vertical axis (unit: [N/MPa]) represents the tightening efficiency index τ. Regarding the horizontal axis and the left vertical axis, the scale ranges in each figure are unified. The vertical axes on the right side indicate ranges from 530 to 580 in FIG. 11A and FIG. 11B, 200 to 700 in FIG. 11C and FIG. 12A to FIG. 12C, 100 to 600 in FIG. 13A to FIG. 13C, and 0 to 500 in FIG. 14A and FIG. 14B. It should be noted that the values of the axes are values in the stator assembly of one example specification without absolute meaning, but are described as a mark for comparing the characteristic data among these figures.

Figure 11A:
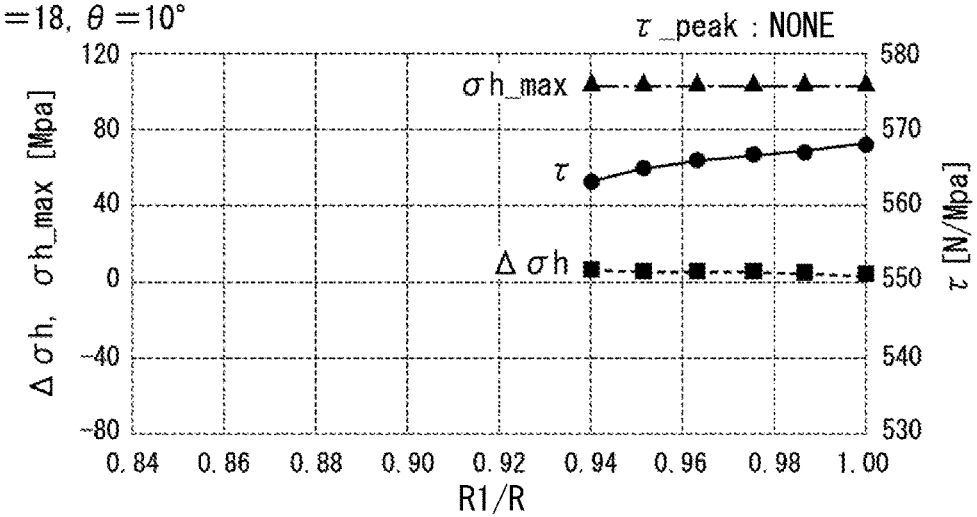
FIG. 11A, FIG. 11B and FIG. 11C are graphs showing relationships between the protrusion radius ratios and comparison parameters in case of the number of periodic units N=18 and the shift angle $\theta=10°$, N=15 and $\theta=12°$, and N=12 and $\theta=15°$, respectively.
Figure 11B:
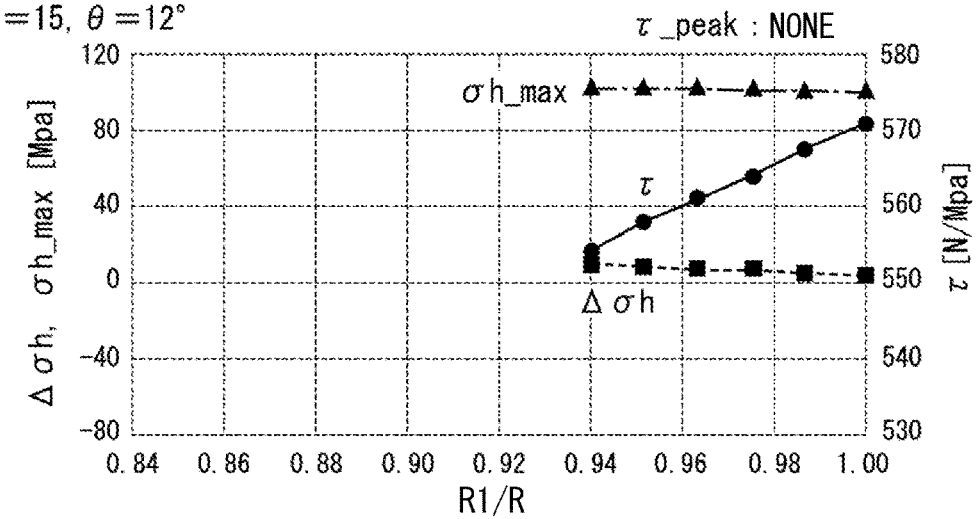
Figure 11C:
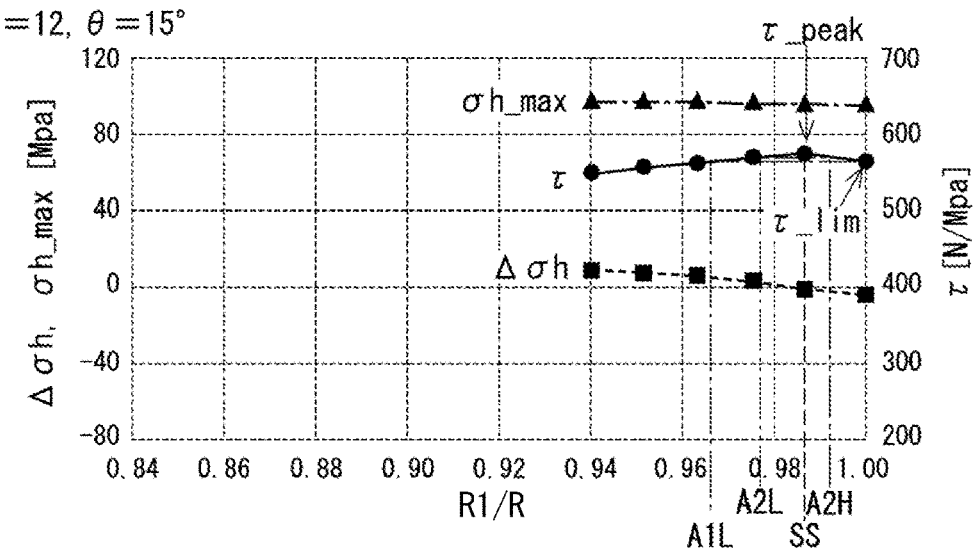
Figure 12A:
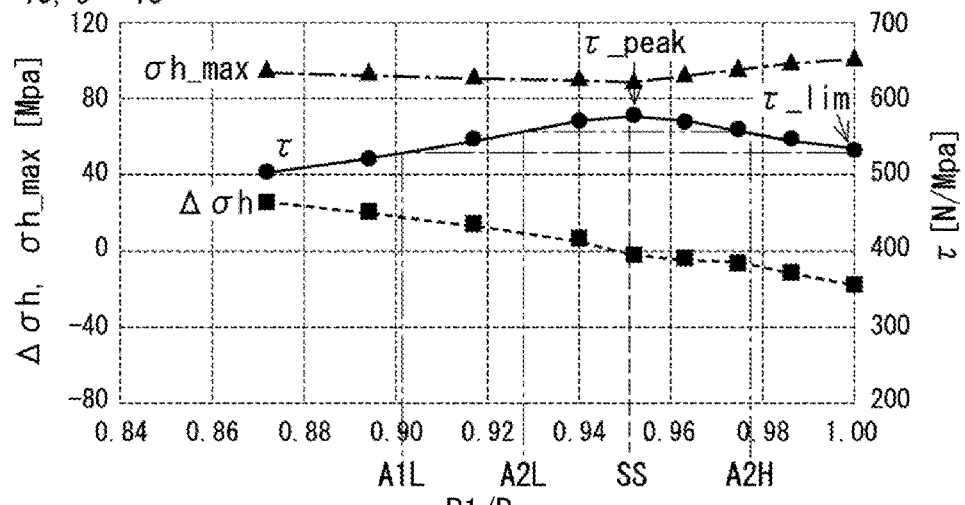
FIG. 12A, FIG. 12B and FIG. 12C are graphs showing relationships between the protrusion radius ratios and comparison parameters in case of the number of periodic units N=10 and the shift angle $\theta=18°$, N=9 and $\theta=20°$, and N=8 and $\theta=22.5°$, respectively.
Figure 12B:
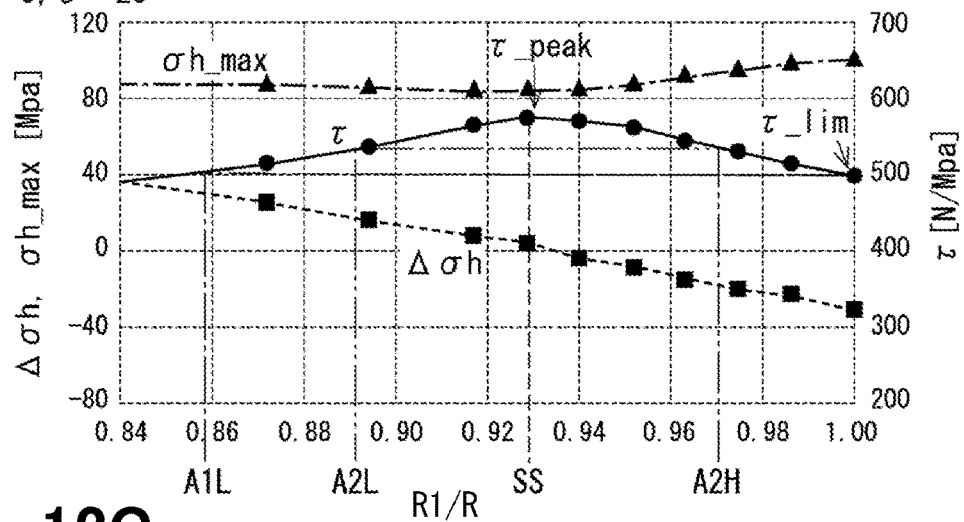
Figure 12C:
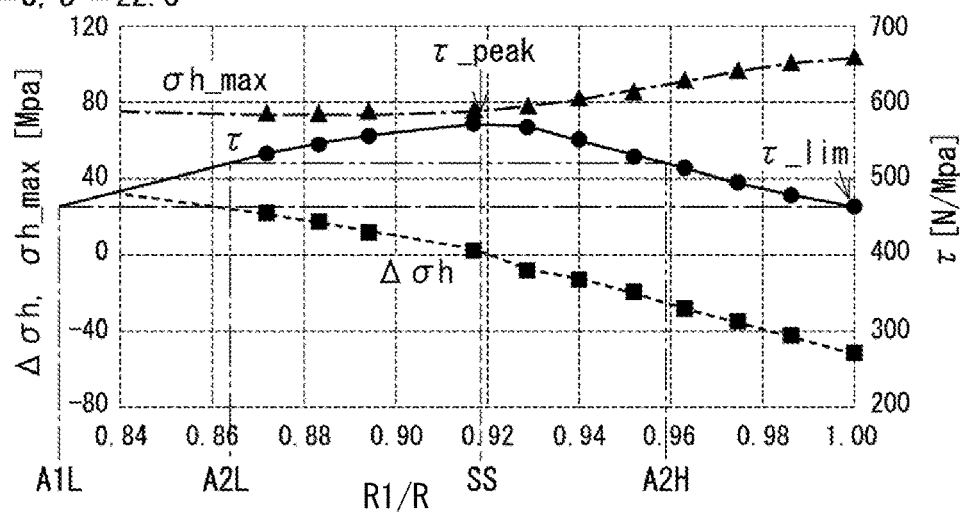
Figure 13A:
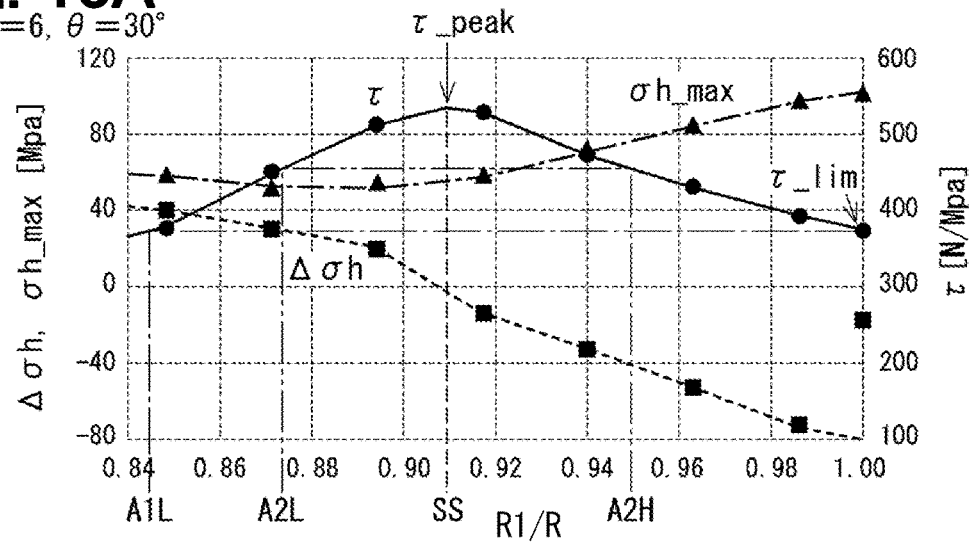
FIG. 13A, FIG. 13B and FIG. 13C are graphs showing relationships between the protrusion radius ratios and comparison parameters in case of the number of periodic units N=6 and the shift angle $\theta=30°$, N=5 and $\theta=36°$, and N=4 and $\theta=45°$, respectively.
Figure 13B:
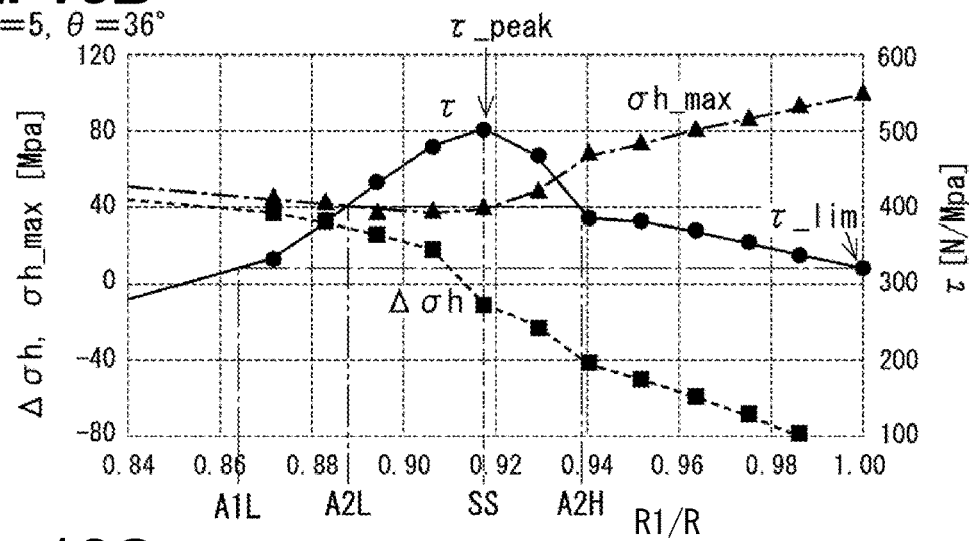
Figure 13C:
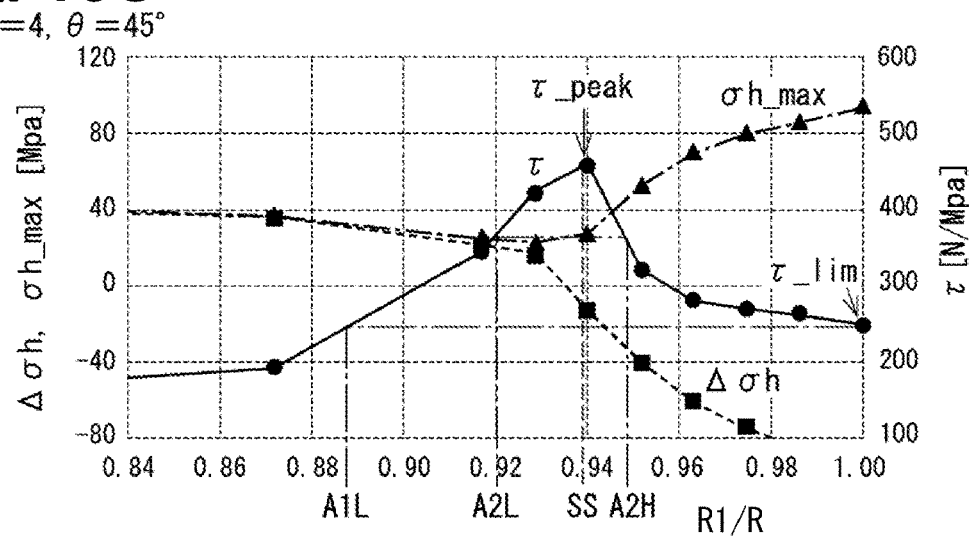
Figure 14A:
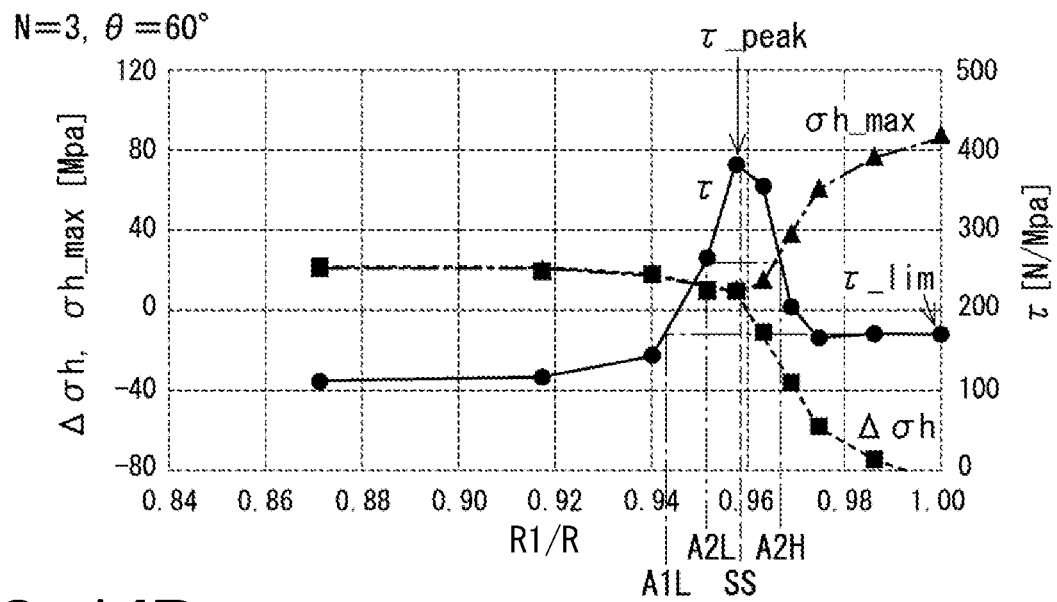
FIG. 14A and FIG. 14B are graphs showing relationships between the protrusion radius ratios and comparison parameters in case of the number of periodic units N=3 and the shift angle $\theta=60°$, and N=2 and $\theta=90°$, respectively.
Figure 14B:
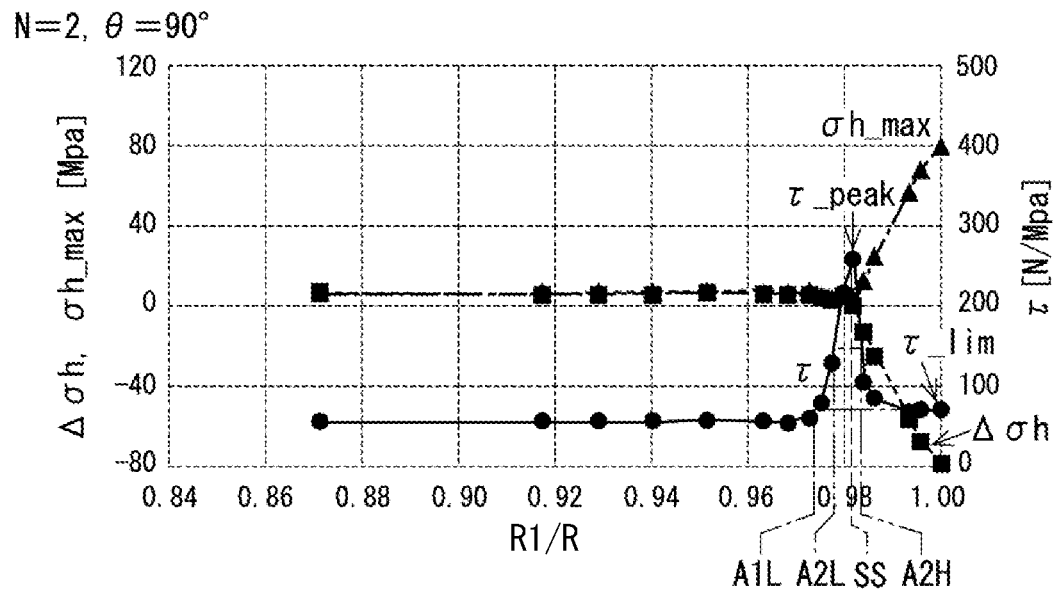

The conditions of the number "n" of the periodic units and the shift angle θ shown in each figure are specified as follows on condition that the number of the unit elements is m=2 and n=1. FIG. 11A: N=18, θ=10°, FIG. 11B: N=15, θ=12°, FIG. 11C: N=12, θ=15°, FIG. 12A: N=10, θ=18°, FIG. 12B: N=9, θ=20°, FIG. 12C: N=8, θ=22.5°, FIG. 13A: N=6, θ=30°, FIG. 13B: N=5, θ=36°, FIG. 13C: N=4, θ=45°, FIG. 14A: N=3, θ=60°, and FIG. 14B: N=2, θ=90°.

At nine shift angles excluding θ=10° (FIG. 11A) and 12° (FIG. 11B) among the eleven shift angles, the housing outer peripheral stress difference Δσh decreases from positive to negative crossing zero as the protrusion radius ratio R1/R increases. That is, the housing outer peripheral stress σh is made uniform at the protrusion radius ratio R1/R near the zero-crossing point.

The maximum value σh_max of the housing outer peripheral stress tends to become smaller near the protrusion radius ratio R1/R where the housing outer peripheral stress difference Δσh crosses zero. Further, a local maximum value τ_peak of the tightening efficiency index exists in a region of 0<R1/R<1. Near the local maximum value τ_peak of the tightening efficiency index, the interference fitting is realized efficiently. That is, when the tightening efficiency index reaches the local maximum value τ_peak, the protrusion radius ratio R1/R becomes the optimum value. This optimum value is referred to as SS.

In case the shift angle θ is 10° (FIG. 11A) or 12° (FIG. 11B), the housing outer peripheral stress difference Δθh is always positive and does not cross zero in the range of 0.94 to 1.0 of the protrusion radius ratio R1/R. The tightening efficiency index τ monotonically increases to the right, and there is no local maximum value τ_peak in the region of 0<R1/R<1. In this case, the tightening efficiency index τ is maximized in the perfect circle core corresponding to the protrusion radius ratio R1/R=1. As a result, it is not possible to achieve the advantage of the present embodiment, that is, it is not possible to set the radius of curvature R1 of the protrusion smaller than the radius R of the circumscribed circle.

In short, in adopting the configuration of the present embodiment, it is a precondition that the shift angle θ is an angle at which the local maximum value τ_peak of the tightening efficiency index exists in the region of 0<R1/R<1. That is, in the examples of FIG. 11A to FIG. 14B, the shift angle θ is preferably set to 15° or more.

Since the optimum value SS of the protrusion radius ratio R1/R is a pinpoint value, an appropriate range of the protrusion radius ratio R1/R including the optimum value SS is considered in consideration of variations in manufacturing process. Here, the value of the tightening efficiency index τ at the protrusion radius ratio R1/R=1 is defined as a limit value τ_lim. In case the tightening efficiency index τ is equal to or less than the limit value τ_lim, the tightening efficiency becomes equal to or less than that of the perfect circle core, and the advantage of adopting the configuration of the present embodiment cannot be achieved.

Therefore, the primary appropriate range of the protrusion radius ratio R1/R, at which the superiority to the perfect circle core is secured to a minimum from the viewpoint of the tightening efficiency, is set to a range where the tightening efficiency index τ exceeds the limit value τ_lim. Therefore, in each of the figures in which the shift angle θ is 15° (FIG. 11C) to 90° (FIG. 14B), the value of the protrusion radius ratio R1/R that is a lower limit of the primary appropriate range is indicated as A1L. The value of the protrusion radius ratio R1/R, which is an upper limit of the primary appropriate range, is 1.0.

Further, an average value of the limit value τ_lim and the local maximum value τ_peak is defined as a middle value τ_mid, and a range, in which the tightening efficiency index τ exceeds the intermediate limit value τ_mid, is defined as a secondary appropriate range. In each figure of the shift angle θ, which is from 15° to 90°, values of the protrusion radius ratios R1/R that are the lower limit and the upper limit of the secondary appropriate range are denoted as A2L and A2H, respectively. The secondary appropriate range is a range where the tightening efficiency is better than the primary appropriate range.

As a boundary of the tightening efficiency index τ that defines the secondary appropriate range, an average value of the limit value τ_lim and the local maximum value τ_peak is a value, which corresponds to 50% from the limit value τ_lim in case that a difference between the limit value τ_lim and the maximum value τ_peak is 100%. Instead of or in addition to the value of 50%, an appropriate range may be set by using other percentage values such as 70%, 90% and the like as a boundary of the tightening efficiency index τ.

Figure 15:
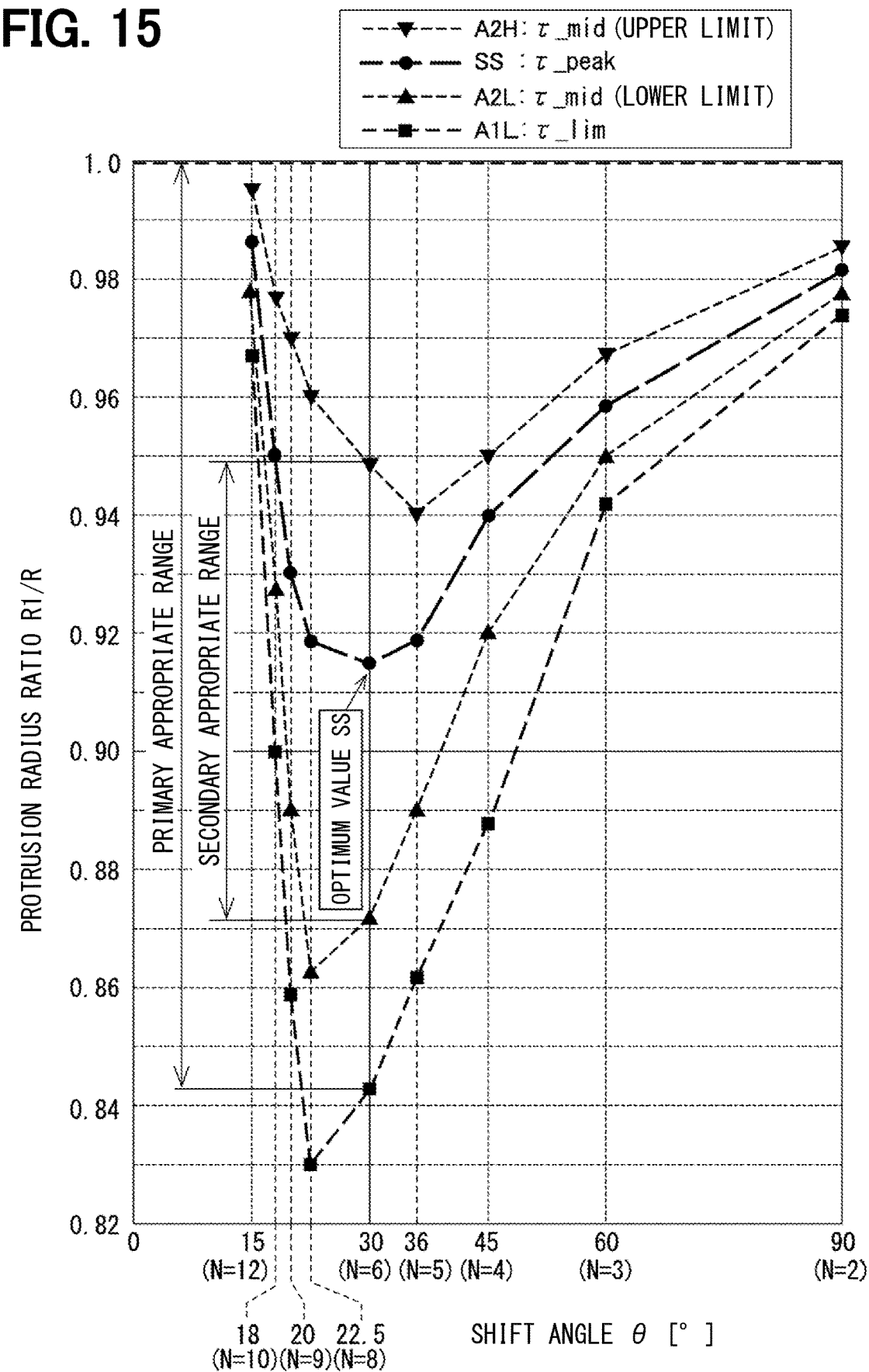
FIG. 15 is a graph showing an optimum value, a primary appropriate range and a secondary appropriate range of the protrusion radius ratio.

FIG. 15 shows, in the shift angle range θ from 15° to 90°, the optimum value SS of the protrusion radius ratio R1/R, the lower limit value A1L of the primary appropriate range, and the lower limit value A2L and the upper limit value A2H of the secondary appropriate range. For example, in case that the shift angle θ is 30°, the optimum value SS is about 0.92, the primary appropriate range is about 0.84 to 1.0, and the secondary appropriate range is about 0.87 to 0.95. In the shift angle range of 20°≤θ≤36°, the appropriate range can be set relatively wide, which is advantageous in manufacturing.

Other Embodiment (A) In FIG. 2 of the above embodiment, the stator 40 is exemplified as having the protrusions 41 and the recesses 42, which are alternately arranged one by one in the circumferential direction, such that the number of unit elements is m=2, the number of periodic units is N=6 and the shift angle is θ=30°. In the present invention, without being limited to this specific example, the relationship of the shift angle θ of the stator 40 is set appropriately in accordance with the number "m" of the unit elements and the number "n" of the periodic units based on the relationship defined by θ=360×n/(m×N), in which "n" is the natural number other than "m."

Figure 16:
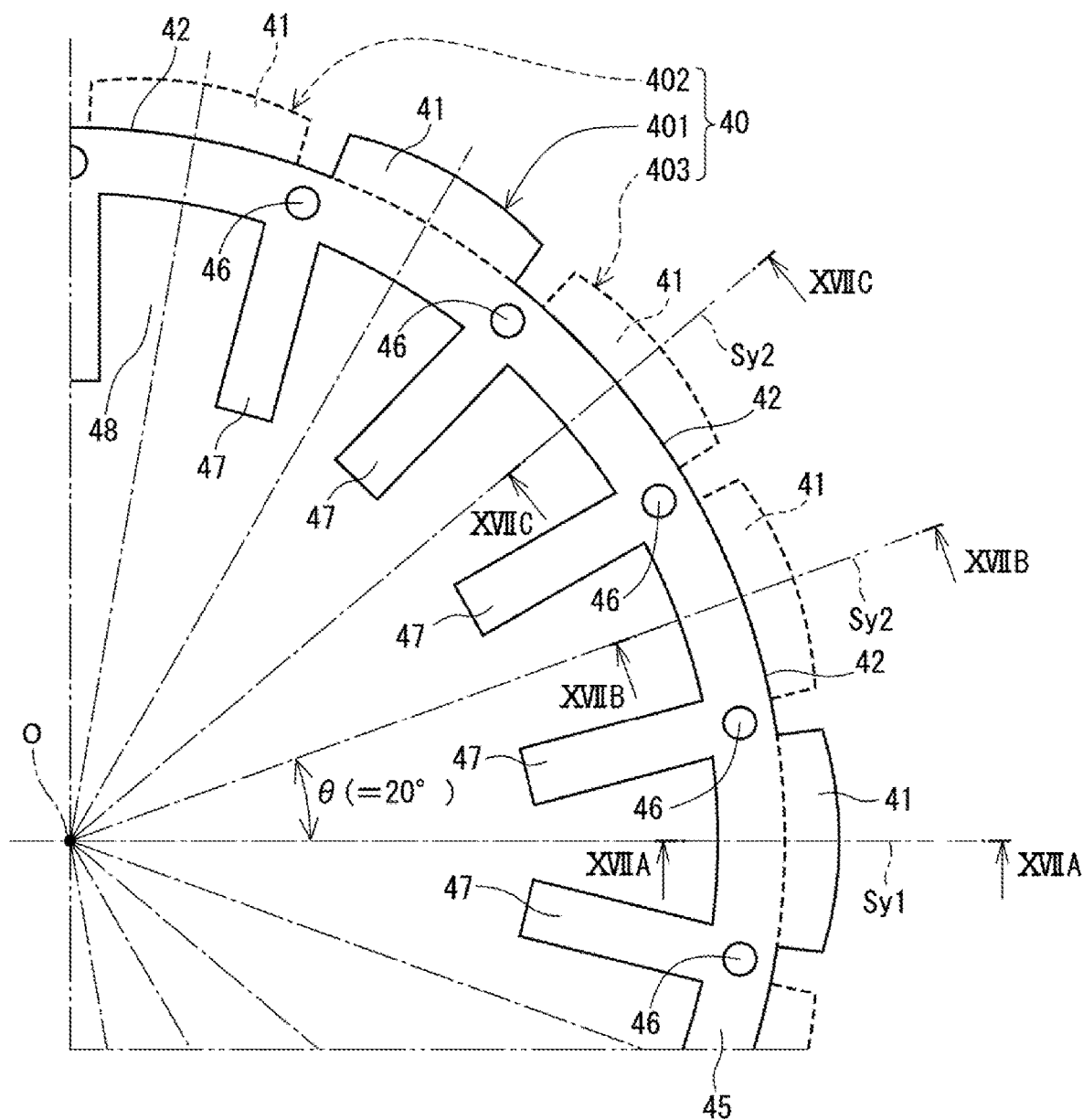
FIG. 16 is a partial view of a stator core according to another embodiment.

For example, as shown in FIG. 16, the periodic units, each of which is configured by one protrusion 41 and following two recesses 42 in the circumferential direction, are arranged in succession. In FIG. 16, the first stator core 401 is indicated by a solid line, and the second and third stator cores 402 and 403 are indicated by broken lines. The magnetic pole teeth 47 of the second and third layers are not shown in this figure. In the example of FIG. 16, the number of unit elements is m=3, the number of periodic units is N=6. In case of n=1, the shift angle is θ=20°. In case of n=2, the shift angle is θ=40°. In case of n=4, the shift angle is θ=80°. That is, the joint portions 46 are arranged at every shift angle θ (20° in this example) with reference to a position shifted by one half of the shift angle θ from the circumferential center of each of the protrusions 41 in the back yoke portion 45.

FIG. 17A shows a cross section of an exemplary case where the number of unit elements is m=3 and six stator cores are axially stacked. In this case, the protrusions 41 of the first and fourth stator cores 401, 404 and the recesses 42 of the second, third, fifth and sixth stator cores 402, 403, 405, 406 appear. In the cross section of FIG. 17B, the protrusions 41 of the second and fifth stator cores 402, 405 and the recesses 42 of the first, third, fourth and sixth stator cores 401, 403, 404, 406 appear. In the cross section of FIG. 17C, the protrusions 41 of the third and sixth stator cores 403, 406 and the recesses 42 of the first, second, fourth and fifth stator cores 401, 402, 404, 405 appear.

In case that the number of unit elements is m=3, the periodic unit may be configured by two protrusions 41 and following one recess 42. In case that the number of unit elements is m=4, there are three different patterns. The first pattern is one protrusion and following three recesses in the circumferential direction. The second pattern is two protrusions and following two recesses in the circumferential direction. The third pattern is three protrusions and one following recess in the circumferential direction. As described above, the periodic unit is configured by periodically combining one or more protrusions 41 and one or more recesses 42.

FIG. 18 shows a relationship between the typical number "m" of unit elements and the number "n" of periodic units and the shift angle θ in case of n=1. In case of N=1, there is only one protrusion 41 for one stator core. Since excessive load is generated in the radial direction, this case is not possible. Therefore, both numbers "m" and "N" must be natural numbers of 2 or more.

(B) In contrast to the stator 40 of the above embodiment in which a plurality of annular stator cores are stacked in the axial direction, the stator may be formed of a plurality of split stator cores, each of which is formed of a plurality of axially stacked arc-shaped stator cores and connected in the circumferential direction. The relationship between the number of divisions of the split type stator core and the number of periodic units may be set arbitrarily.

That is, although the shift angle may be rephrased as a rolling angle in the above embodiment, the rolling angle is not proper in the manufacturing process using the split stator cores. Therefore, in this specification, the term shift angle is used for the angle between the adjacent protrusion 41 and recess 42, including the configuration of the split stator core.

(C) The rotor 60 is not limited to the IPM structure, but may be configured with an SPM structure in which the permanent magnet 65 is provided on the surface of the rotor core 64. Further, the rotor 60 is not limited to the stack structure, but may be formed of a single block rotor core which is not separated in the axial direction.

(D) The housing 30 may be made of aluminum or an aluminum alloy other than the ADC 12, or magnesium or a magnesium alloy. In particular, in case that a material having a yield point or a 0.2% proof stress of 200 [MPa] or less is used, the effect of equalizing the housing outer peripheral stress according to the present embodiment is remarkably exhibited.

The present disclosure should not be limited to the embodiments described above, but various other embodiments may be implemented without departing from the scope of the present invention.

What is claimed is:
1. A stator assembly comprising:
a cylindrical housing; and
a stator fixed to an inner wall of the cylindrical housing by interference fitting, and formed of a plurality of stator cores, the plurality of stator cores comprising a plurality of annular stator cores stacked in an axial direction or a plurality of split stator cores connected in a circumferential direction, wherein:
each stator core of the plurality of stator cores includes a plurality of protrusions and a plurality of recesses provided periodically in the circumferential direction on an outer periphery, the plurality of protrusions abutting at least a part of the inner wall of the cylindrical housing in the circumferential direction, and each recess of the plurality of recesses being smaller than each protrusion of the plurality of protrusions in a radial direction and having a gap relative to the inner wall of the cylindrical housing;
adjacent stator cores are shifted in the circumferential direction by a predetermined shift angle such that a periodic unit formed of at least one protrusion and at least one recess are positioned alternately in the axial direction; and
the plurality of protrusions have a radius of curvature smaller than a radius of a circumscribed circle at a part of the plurality of protrusions abutting the inner wall of the cylindrical housing.
2. The stator assembly according to claim 1, wherein:
the shift angle is set to have a local maximum value of a tightening efficiency index in a region where a protrusion radius ratio is larger than 0 and smaller than 1, assuming that the protrusion radius ratio is determined by dividing the radius of curvature of the part of the plurality of protrusions abutting the inner wall of the cylindrical housing by the radius of the circumscribed circle of the plurality of protrusions, and assuming that the tightening efficiency index indicates an efficiency of the interference fitting and is determined by dividing a stator reaction force, which the stator applies to the cylindrical housing when the stator is assembled with the cylindrical housing by the interference fitting, by a maximum value of a housing outer peripheral stress, which is applied to the cylindrical housing.

3. The stator assembly according to claim 2, wherein:
the protrusion radius ratio is set to be in a range, in which the tightening efficiency index exceeds a limit value, which is a value when the protrusion radius ratio is 1.

4. The stator assembly according to claim 3, wherein:
the protrusion radius ratio is set in a range, in which the tightening efficiency index exceeds a middle limit value that is an average value between the limit value and the local maximum value.

5. The stator assembly according to claim 1, wherein:
each stator core of the plurality of stator cores has a plurality of magnetic pole teeth protruding from an annular back yoke portion in a radially inward direction and arranged in the circumferential direction; and
the plurality of magnetic pole teeth is formed at circumferential positions shifted in a direction opposite to a circumferential direction of deformation, which is caused by the interference fitting, before the stator is tightened by the interference fitting, relative to target circumferential positions at which the plurality of magnetic pole teeth is positioned.

6. The stator assembly according to claim 1, wherein:
each stator core of the plurality of stator cores has a plurality of magnetic pole teeth protruding from an annular back yoke portion in a radially inward direction and arranged in the circumferential direction; and
the plurality of magnetic pole teeth is formed at radial positions shifted in a direction opposite to a radial direction of deformation, which is caused by the interference fitting, before the stator is tightened by the interference fitting, relative to target radial positions at which the plurality of magnetic pole teeth are positioned.

7. The stator assembly according to claim 1, wherein:
each stator core of the plurality of stator cores has a plurality of joint portions provided at every shift angle in the axial direction relative to a reference position, each respective joint portion of the plurality of joint portions being shifted by one half of the shift angle from a circumferential center of each respective protrusion of the plurality of protrusions in an annular back yoke portion of each stator core of the plurality of stator cores.

8. The stator assembly according to claim 1, wherein:
the cylindrical housing and the stator are made of materials having different linear expansion coefficients.

9. The stator assembly according to claim 1, wherein:
the cylindrical housing is made of aluminum, aluminum alloy, magnesium or magnesium alloy.

10. The stator assembly according to claim 1, wherein:
the shift angle is determined as $360 \times n/(m \times N)$, in which "N" is a number of periodic units, "m" is a total number of the plurality of protrusions and the plurality of recesses in one periodic unit and "n" is a natural number other than "m".

11. The stator assembly according to claim 1, wherein:
each stator core of the plurality of stator cores has a plurality of magnetic pole teeth arranged in the circumferential direction and protruding from an annular back yoke portion in a radially inward direction at boundaries between the plurality of protrusions and the plurality of recesses;
adjacent two of the plurality of magnetic pole teeth that sandwich each protrusion of the plurality of protrusions are inclined inwardly in the circumferential direction before the plurality of stator cores are assembled to the cylindrical housing by the interference fitting;
adjacent two of the plurality of magnetic pole teeth that sandwich each recess of the plurality of recesses are inclined outwardly in the circumferential direction before the plurality of stator cores are assembled to the cylindrical housing by the interference fitting; and
a circumferential distance between tip ends of the adjacent two of the plurality of magnetic pole teeth that sandwich each protrusion of the plurality of protrusions is shorter than that between tip ends of the adjacent two of the plurality of magnetic pole teeth that sandwich each recess of the plurality of recesses.

12. The stator assembly according to claim 1, wherein:
each stator core of the plurality of stator cores has a plurality of magnetic pole teeth arranged in the circumferential direction and protruding from an annular back yoke portion in a radially inward direction at positions where the plurality of protrusions and the plurality of recesses are provided; and
each magnetic pole tooth of the plurality of magnetic pole teeth protruding from a position where each protrusion of the plurality of protrusions is provided is shorter in length in the radial direction than each magnetic pole tooth of the plurality of magnetic pole teeth protruding from a position where each recess of the plurality of recesses is provided, before the plurality of stator cores are assembled to the cylindrical housing by the interference fitting.

13. A motor comprising:
the stator assembly according to claim 1;
a coil wound around a plurality of magnetic pole teeth, which protrudes from an annular back yoke portion of each stator core of the plurality of stator cores in a radially inward direction; and
a rotor provided radially inside the stator to be rotatable with a gap relative to the stator.

* * * * *